(12) United States Patent
Hirata et al.

(10) Patent No.: US 10,988,174 B2
(45) Date of Patent: Apr. 27, 2021

(54) PARKING ASSIST DEVICE, PARKING ASSIST METHOD, AND DRIVING ASSIST DEVICE

(71) Applicant: AISIN SEIKI KABUSHIKI KAISHA, Kariya (JP)

(72) Inventors: Hironori Hirata, Anjo (JP); Hiroki Inagaki, Okazaki (JP); Kenichi Ohshima, Wako (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 193 days.

(21) Appl. No.: 15/991,077

(22) Filed: May 29, 2018

(65) Prior Publication Data

US 2018/0354556 A1    Dec. 13, 2018

(30) Foreign Application Priority Data

Jun. 9, 2017    (JP) .............................. JP2017-114594

(51) Int. Cl.
| | |
|---|---|
| B62D 15/02 | (2006.01) |
| G06F 3/0481 | (2013.01) |
| G06F 3/0488 | (2013.01) |
| G06K 9/00 | (2006.01) |
| G06T 7/13 | (2017.01) |
| G06T 7/70 | (2017.01) |
| G06T 3/40 | (2006.01) |

(52) U.S. Cl.
CPC ....... B62D 15/0285 (2013.01); G06F 3/0488 (2013.01); G06F 3/04817 (2013.01); G06K 9/00798 (2013.01); G06K 9/00812 (2013.01); G06T 3/4038 (2013.01); G06T 7/13 (2017.01); G06T 7/70 (2017.01); G06T 2207/30264 (2013.01)

(58) Field of Classification Search
CPC ..... B62D 15/02; G06F 3/0481; G06F 3/0488; G06T 7/70; G06T 7/13; G06K 9/00
See application file for complete search history.

(56) References Cited

U.S. PATENT DOCUMENTS 9,120,425 B2 * 9/2015 Tate, Jr. ................ B60L 53/124
10,328,932 B2 * 6/2019 Gieseke ............ B60W 50/0097
(Continued)

FOREIGN PATENT DOCUMENTS

| JP | 2010-269707 A | 12/2010 |
| JP | 2012-76483 A | 4/2012 |
| JP | 2015-76645 A | 4/2015 |

*Primary Examiner* — Mia M Thomas
(74) *Attorney, Agent, or Firm* — Sughrue Mion, PLLC

(57) ABSTRACT

A parking assist device according to an embodiment includes: a peripheral image generation unit configured to generate a peripheral image representing conditions around a vehicle based on an imaging result of an imaging unit provided to the vehicle; a parking region acquisition unit configured to acquire a parking region where the vehicle is parkable; a display processing unit configured to display the peripheral image on a display device including a touch panel, and display a first symbol representing the parking region on the peripheral image; and an assist processing unit configured to start, when a position corresponding to the first symbol on the touch panel is touched, parking assist control for assisting parking at the parking region represented by the first symbol.

17 Claims, 15 Drawing Sheets

(56) References Cited

U.S. PATENT DOCUMENTS

| | | | |
|---|---|---|---|
| 10,532,746 B2* | 1/2020 | Park | B60W 50/082 |
| 10,621,867 B2* | 4/2020 | Li | G08G 5/0069 |
| 10,870,446 B2* | 12/2020 | Fujii | B62D 6/001 |
| 2007/0282489 A1* | 12/2007 | Boss | B62D 15/0285 701/2 |
| 2008/0065293 A1* | 3/2008 | Placke | B60K 31/0008 701/41 |
| 2009/0005929 A1* | 1/2009 | Nakao | B62D 1/02 701/33.4 |
| 2011/0013201 A1* | 1/2011 | Scherl | G01S 17/931 356/628 |
| 2012/0191284 A1* | 7/2012 | Fehse | B62D 15/0275 701/23 |
| 2013/0144492 A1* | 6/2013 | Takano | B62D 15/027 701/42 |
| 2014/0095021 A1* | 4/2014 | Tate | B60L 53/38 701/36 |
| 2014/0156148 A1* | 6/2014 | Kikuchi | B62D 15/0285 701/48 |
| 2014/0310594 A1* | 10/2014 | Ricci | H04L 67/12 715/702 |
| 2015/0211868 A1* | 7/2015 | Matsushita | G08G 1/166 701/457 |
| 2016/0075375 A1* | 3/2016 | Yamashita | B62D 15/028 701/41 |
| 2016/0207540 A1* | 7/2016 | Liu | B60W 40/072 |
| 2016/0284217 A1* | 9/2016 | Lee | B60K 31/0008 |
| 2016/0288833 A1* | 10/2016 | Heimberger | B62D 15/027 |
| 2016/0322078 A1* | 11/2016 | Bose | A63B 71/06 |
| 2016/0375768 A1* | 12/2016 | Konet | B60W 30/0953 348/148 |
| 2017/0243072 A1* | 8/2017 | Herman | G06K 9/00785 |
| 2017/0357270 A1* | 12/2017 | Russell | G05D 1/0242 |
| 2017/0369078 A1* | 12/2017 | Freistadt | B62D 15/0285 |
| 2018/0162446 A1* | 6/2018 | Mikuriya | B62D 15/024 |
| 2018/0345960 A1* | 12/2018 | Fujii | B62D 15/0255 |
| 2018/0350242 A1* | 12/2018 | Fujii | B60W 30/18163 |
| 2018/0373250 A1* | 12/2018 | Nakamura | G05D 1/0061 |
| 2019/0039606 A1* | 2/2019 | Fujita | B60W 50/14 |
| 2020/0277009 A1* | 9/2020 | Murasumi | G06K 9/00791 |
| 2020/0290615 A1* | 9/2020 | Kato | B60W 30/18018 |

* cited by examiner

PARKING ASSIST DEVICE, PARKING ASSIST METHOD, AND DRIVING ASSIST DEVICE

CROSS-REFERENCE TO RELATED APPLICATIONS

This application is based upon and claims the benefit of priority from Japanese Patent Application No. 2017-114594, filed Jun. 9, 2017, the entire contents of which are incorporated herein by reference.

FIELD

Embodiments described herein relate generally to a parking assist device, a parking assist method, and a driving assist device.

BACKGROUND

Conventionally, techniques for executing parking assist control for moving a vehicle to a parking region serving as a parking target by automated driving while displaying the parking region on a peripheral image that represents the conditions around the vehicle have been known. Examples of such conventional techniques include a technique for starting parking assist control when a position on a touch panel corresponding to a start button displayed in a region different from (apart from) a region in which a peripheral image and a parking region are displayed is touched in a state in which the peripheral image and the parking region are displayed on a display. An example of the conventional techniques is described in Japanese Patent Application Laid-open No. 2015-76645.

In the above-mentioned conventional techniques, however, the peripheral image and the parking region are displayed in a region different from (apart from) the region in which the start button is displayed, and hence the relation therebetween is less intuitively intelligible. In particular, when there are parking regions where the vehicle is parkable, it is hard for a user to recognize for which parking region the parking assist control will be started by the operation of the start button, and therefore the operation may be complicated.

SUMMARY

It is therefore an object of an embodiment to provide an interface that makes an operation for starting the parking assist control intuitively intelligible and simple.

A parking assist device according to a first aspect of the embodiment includes a peripheral image generation unit configured to generate a peripheral image representing conditions around a vehicle based on an imaging result of an imaging unit provided to the vehicle; a parking region acquisition unit configured to acquire a parking region where the vehicle is parkable; a display processing unit configured to display the peripheral image on a display device including a touch panel, and display a first symbol representing the parking region on the peripheral image; and an assist processing unit configured to start, when a position corresponding to the first symbol on the touch panel is touched, parking assist control for assisting parking at the parking region represented by the first symbol. Consequently, the parking assist control at a parking region represented by a first symbol can be started simply by touching the position corresponding to the first symbol, and hence an interface that makes the operation for starting the parking assist control intuitively intelligible and simple can be provided.

In the above-described parking assist device, the assist processing unit is configured to stop the parking assist control when the position corresponding to the first symbol is touched after the parking assist control is started. Consequently, after the start of the parking assist control, the currently executed parking assist control can be stopped in an intuitively intelligible and simple manner simply by touching the first symbol corresponding to a parking region serving as a parking target in the parking assist control.

In this configuration, the display processing unit is configured to make a display form of the first symbol before the parking assist control is started different from a display form of the first symbol after the parking assist control is started. Consequently, simply by viewing the display form of the first symbol, it can be easily determined whether the parking assist control is not started yet or has been started, that is, whether the parking assist control is currently executed.

Also, in the above-described parking assist device, the display processing unit is configured to make a display form of the first symbol when the position corresponding to the first symbol is touched different from a display form of the first symbol when the position corresponding to the first symbol is not touched. Consequently, a user can be visually intelligibly notified whether the position corresponding to the first symbol was reliably touched.

Also, in the above-described parking assist device, the display processing unit is configured to further display, near the first symbol, a second symbol that prompts a user to touch a position corresponding to the first symbol. Consequently, the second symbol enables the user to be visually intelligibly notified that a trigger to start the parking assist control is to touch the position corresponding to the first symbol.

In this configuration, the display processing unit is configured to display the second symbol only when speed of the vehicle is equal to or lower than a threshold. Consequently, the display of the second symbol, which may hinder the confirmation of the conditions around the vehicle, can be limited to only a situation where the speed of the vehicle is equal to or lower than a threshold, which is the situation where the conditions around the vehicle are not abruptly changed.

Also, in the above-described parking assist device, when the vehicle is unparkable in a first region that has been recently acquired as the parking region due to movement of the vehicle, the parking region acquisition unit is configured to newly acquire a second region as the parking region that is different from the first region, and the display processing unit is configured to display the first symbol in such a display form that switching of the parking region from the first region to the second region is recognizable. Consequently, the user can be visually intelligibly notified of the switching of the parking region.

Also, in the above-described parking assist device, the peripheral image generation unit is configured to generate different types of peripheral images, and the display processing unit is configured to display the peripheral images side by side, and display the first symbol on each of the peripheral images. Consequently, when peripheral images are displayed side by side, the same parking assist control can be started when the position corresponding to the first symbol on either one of the peripheral images is touched.

In this configuration, the display processing unit is configured to fixedly display a button serving as a trigger to cause the assist processing unit to start the parking assist control in a region near one of the peripheral images that is displayed at a position closest to a driver's seat in the vehicle. Consequently, the button that is more directly intelligible as the trigger to start the parking assist control can be fixedly provided at a position at which the button is easily operated from the driver's seat.

Also, in the above-described parking assist device, when a nearby position near a position corresponding to the first symbol has been continuously touched for a predetermined period or more, the display processing unit is configured to move a display position of the first symbol toward the nearby position. Consequently, the display position of the first symbol can be easily adjusted by an intuitively intelligible operation method involving a long-press operation onto a movement target position.

Also, in the above-described parking assist device, the peripheral image includes an overhead image in which the conditions around the vehicle are seen from above in a bird's eye view. Consequently, the overhead image enables the user to be intelligibly notified of the conditions (and parking regions) around the vehicle.

Also, in the above-described parking assist device, the peripheral image includes a 3D image that three-dimensionally represents the conditions around the vehicle. Consequently, the 3D image enables the user to be intelligibly notified of the conditions (and parking regions) around the vehicle.

Also, in the above-described parking assist device, the first symbol includes a frame displayed so as to surround the parking region. Consequently, the parking region can be displayed with emphasis in a visually intelligible manner.

Also, in the above-described parking assist device, the parking assist device further comprising a leaving route acquisition unit configured to acquire a leaving route for the parked vehicle, wherein the display processing unit is configured to display a third symbol representing a leaving direction along the leaving route on the peripheral image, and the assist processing unit is configured to start, when a position corresponding to the third symbol on the touch panel is touched, leaving assist control for assisting leaving along the leaving direction represented by the third symbol. Consequently, the leaving assist control for moving the vehicle along a leaving direction represented by the third symbol can be started simply by touching the position corresponding to the third symbol, and hence an interface that makes an operation for starting the leaving assist control intuitively intelligible and simple can be provided.

A parking assist method according to a second aspect of the embodiment includes generating a peripheral image representing conditions around a vehicle based on an imaging result of an imaging unit provided to the vehicle; acquiring a parking region where the vehicle is parkable; displaying the peripheral image on a display device including a touch panel, and displaying a first symbol representing the parking region on the peripheral image; and starting, when a position corresponding to the first symbol on the touch panel is touched, parking assist control for assisting parking at the parking region represented by the first symbol. Consequently, the parking assist control at a parking region represented by the first symbol can be started simply by touching the position corresponding to the first symbol, and hence an interface that makes an operation for starting the parking assist control intuitively intelligible and simple can be provided.

A driving assist device according to a third aspect of the embodiment includes a peripheral image generation unit configured to generate a peripheral image representing conditions around a vehicle based on an imaging result of an imaging unit provided to the vehicle; an acquisition unit configured to acquire a target position or a target direction on a route in which the vehicle is movable; a display processing unit configured to display the peripheral image on a display device including a touch panel, and display a symbol representing the target position or the target direction on the peripheral image; and an assist processing unit configured to start, when a position corresponding to the symbol on the touch panel is touched, assist for moving the vehicle to the target position represented by the symbol or moving the vehicle along the target direction represented by the symbol. Consequently, assist for moving the vehicle to a target position represented by the symbol or moving the vehicle along the target direction represented by the symbol can be started simply by touching the position corresponding to the symbol on the touch panel, and hence an interface that makes an operation for starting the driving assist control intuitively intelligible and simple can be provided.

DETAILED DESCRIPTION

Embodiments are described below with reference to the drawings. Configurations according to the embodiments described below and operations and results (effects) achieved by the configurations are merely an example, and are not limited to the following description.

Figure 1:
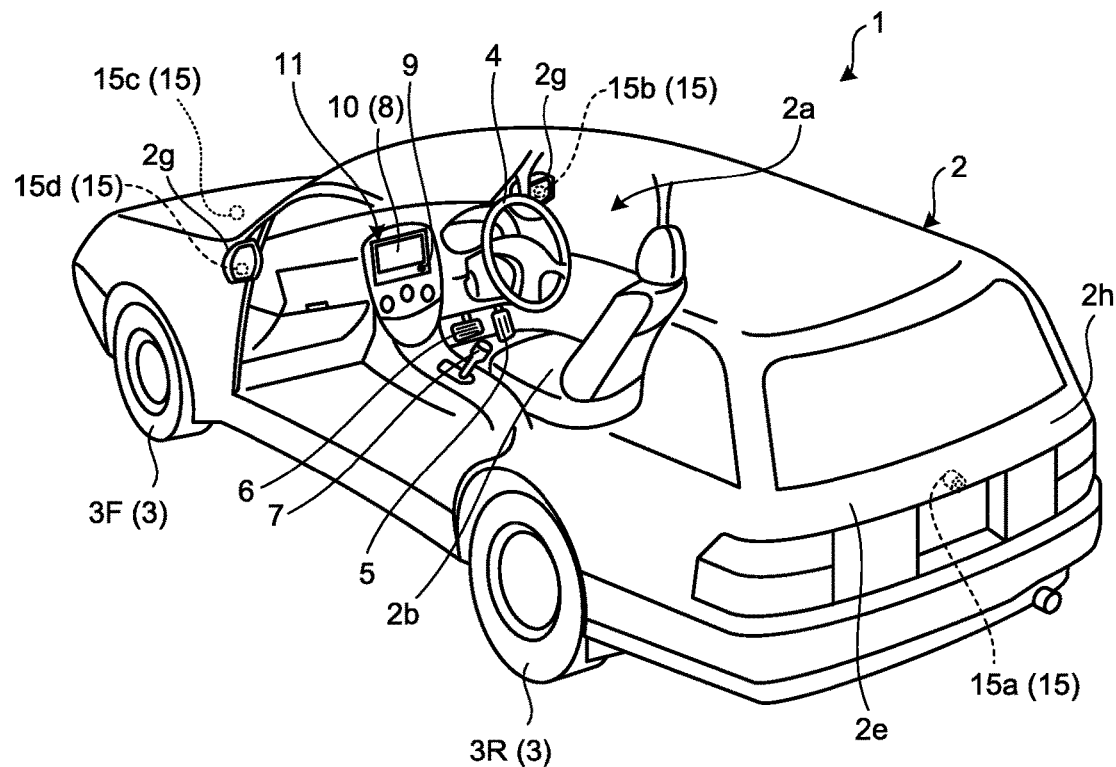
FIG. 1 is a schematic and exemplary perspective view illustrating a state in which a part of a vehicle interior of a vehicle according to the embodiment is seen.
Figure 2:
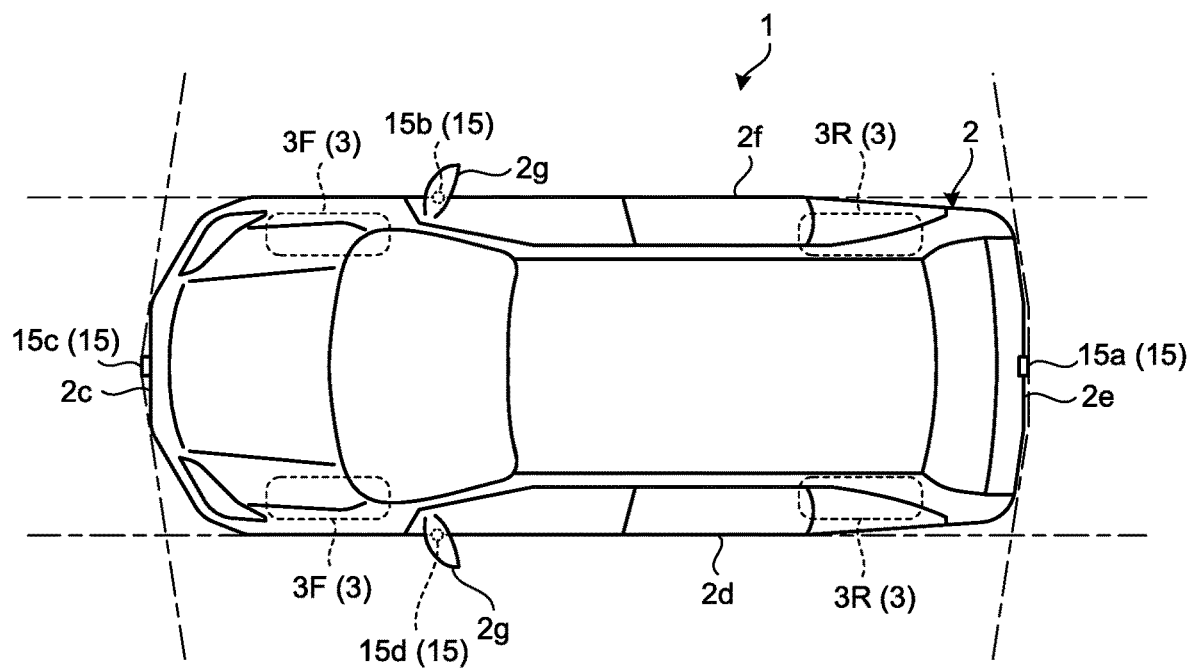
FIG. 2 is a schematic and exemplary plan view (bird's eye view) illustrating the appearance of the vehicle according to the embodiment when viewed from above.

First, the schematic configuration of a vehicle 1 according to an embodiment is described with reference to FIG. 1 and FIG. 2. FIG. 1 is a schematic and exemplary perspective view illustrating a state in which a part of a vehicle interior 2a of the vehicle 1 according to the embodiment is seen. FIG. 2 is a schematic and exemplary plan view (bird's eye view) illustrating the appearance of the vehicle 1 according to the embodiment when viewed from above.

As illustrated in FIG. 1, the vehicle 1 according to the embodiment has the vehicle interior 2a in which occupants including a driver as a user ride. In the vehicle interior 2a, a steering unit 4, an acceleration operation unit 5, a braking operation unit 6, a gear shift operation unit 7, and the like are provided in the state in which the user can operate these units from a seat 2b.

The steering unit 4 is a steering wheel protruding from a dashboard (instrument panel). The acceleration operation unit 5 is an accelerator pedal provided under a foot of the driver. The braking operation unit 6 is a brake pedal provided under the foot of the driver. The gear shift operation unit 7 is a shift lever protruding from a center console.

In the vehicle interior 2a, a display device (monitor device) 11 having a display 8 capable of outputting various kinds of images and a voice output device 9 capable of outputting various kinds of voice is provided. The display device 11 is provided at a center part of the dashboard in the vehicle width direction (right-left direction) in the vehicle interior 2a. The display 8 includes a liquid crystal display (LCD) or an organic electroluminescence display (OELD) and is configured to, for example, display a peripheral image representing the conditions around the vehicle 1. Specific details of the peripheral image are described later. Examples of the peripheral image include an overhead image in which the conditions around the vehicle 1 are seen from above in a bird's eye view.

In the display 8 according to the embodiment, in a region in which an image is displayed, that is, a display screen, a touch panel 10 capable of detecting coordinates of a position at which an indicator such as a finger or a stylus approaches (including contact) in the display screen is provided. Accordingly, the user (driver) can visually recognize an image displayed on the display screen of the display 8, and can execute various kinds of operation inputs by performing an input operation (for example, a touch (tap) operation) on the touch panel 10 by using the indicator.

In the embodiment, the display device 11 may have various kinds of physical operation input units, such as a switch, a dial, a joystick, and a push button. In the embodiment, another voice output device may be provided at a position different from the position of the display device 11 in the vehicle interior 2a. In this case, various kinds of voice information can be output from both of the voice output device 9 and the other voice output device. In the embodiment, the display device 11 may be configured to display information on various kinds of systems such as a navigation system and an audio system.

As illustrated in FIG. 1 and FIG. 2, the vehicle 1 according to the embodiment is a four-wheeled vehicle having two right and left front wheels 3F and two right and left rear wheels 3R. In the following, the front wheels 3F and the rear wheels 3R may be referred to generally as "wheels 3" for simplicity. In the embodiment, the skid angle of some or all of the four wheels 3 changes (turns) in accordance with the steering of the steering unit 4.

The vehicle 1 has a plurality of (four in the example in FIG. 1 and FIG. 2) imaging units 15a to 15d. The imaging unit 15a is provided at an end portion 2e on the rear side of a vehicle body 2 (for example, in the lower position of a door 2h of a rear trunk), and takes an image of a region behind the vehicle 1. The imaging unit 15b is provided to a door mirror 2g at an end portion 2f on the right side of the vehicle body 2, and takes an image of a region on the right side of the vehicle 1. The imaging unit 15c is provided at an end portion 2c on the front side of the vehicle body 2 (for example, front bumper), and takes an image of a region ahead of the vehicle 1. The imaging unit 15d is provided to a door mirror 2g at an end portion 2d on the left side of the vehicle body 2, and takes an image of a region on the left side of the vehicle 1. In the following, the imaging units 15a to 15d may be referred to generally as "imaging units 15" for simplicity.

The imaging units 15 are, for example, what are called digital cameras having an imaging element such as a charge coupled device (CCD) and a complementary metal oxide semiconductor (CMOS) image sensor (CIS). The imaging units 15 take images around the vehicle 1 at a predetermined frame rate, and output image data of the captured images obtained by the imaging.

The image data obtained from the imaging units 15 can be used to form a moving image as a frame image. The image data obtained from the imaging units 15 can also be used to detect three-dimensional objects present around the vehicle 1. The three-dimensional objects as used herein include stationary objects such as other parked vehicles and moving objects such as moving pedestrians. Furthermore, the image data obtained from the imaging units 15 can be used to detect parking regions where the vehicle 1 is parkable. The parking region may be a region explicitly sectioned by a parking frame such as a white line or a region that is not explicitly sectioned by a white line, as long as the region has a size large enough for the vehicle 1 to be parked.

In the embodiment, a distance measurement sensor configured to detect (calculate, specify) distances to three-dimensional objects present around the vehicle 1 may be provided in addition to the above-mentioned imaging units 15 as a configuration for sensing the conditions around the vehicle 1. As such a distance measurement sensor, for example, a laser distance measurement sensor configured to emit light such as laser light and receive light reflected from three-dimensional objects present around the vehicle 1 is used.

Figure 3:
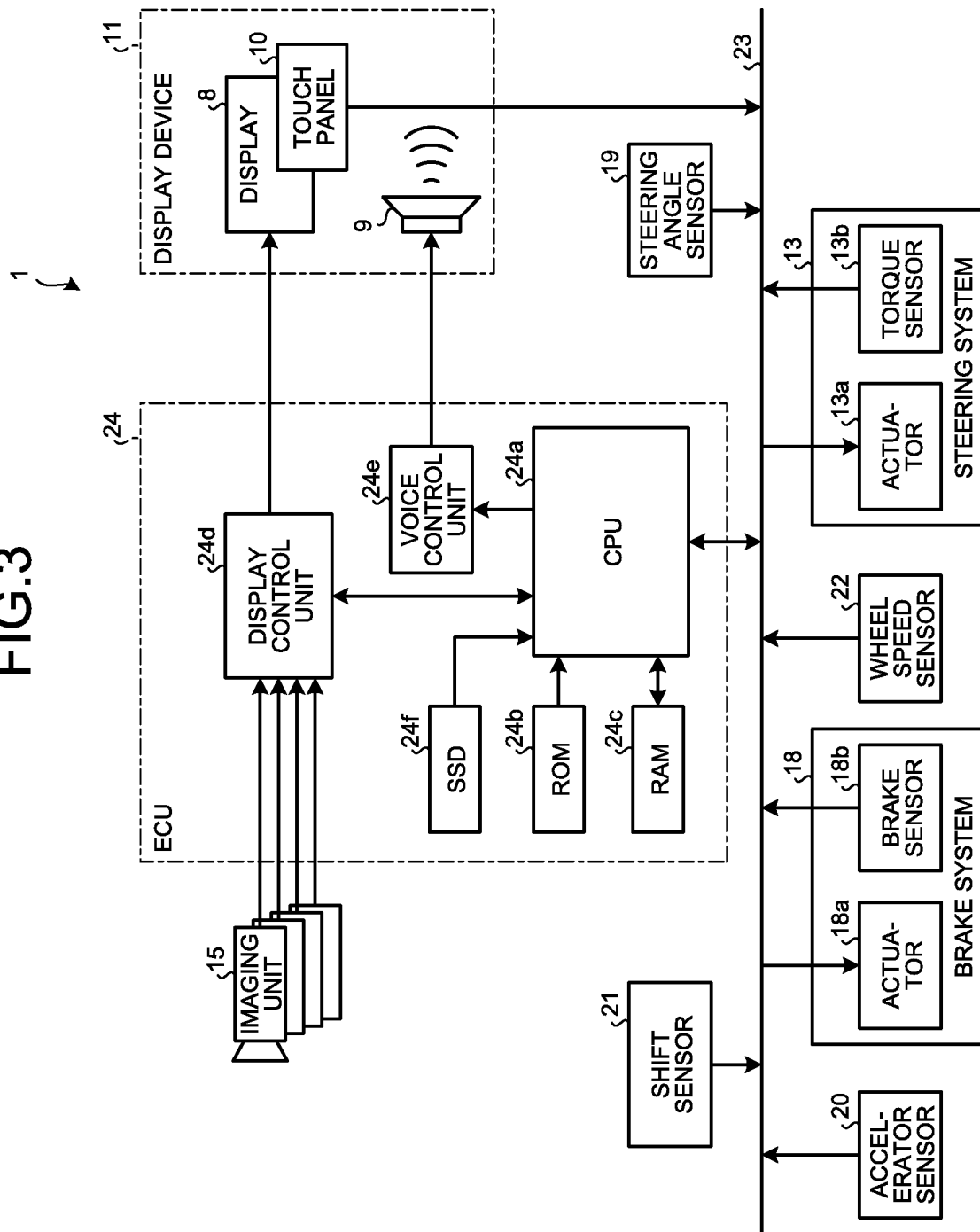
FIG. 3 is a schematic and exemplary block diagram illustrating the internal configuration of the vehicle according to the embodiment.

Next, the internal configuration of the vehicle 1 according to the embodiment is described with reference to FIG. 3. FIG. 3 is a schematic and exemplary block diagram illustrating the configuration inside the vehicle 1 according to the embodiment.

As illustrated in FIG. 3, the vehicle 1 according to the embodiment is provided with the display device 11, a steering system 13, the imaging units 15, a brake system 18, a steering angle sensor 19, an accelerator sensor 20, a shift sensor 21, a wheel speed sensor 22, and an electronic control unit (ECU) 24.

The above-mentioned various kinds of configurations (display device 11, steering system 13, brake system 18, steering angle sensor 19, accelerator sensor 20, shift sensor 21, wheel speed sensor 22, and ECU 24) are electrically connected to each other through an in-vehicle network 23. The in-vehicle network 23 is, for example, an electric communication line composed of a controller area network (CAN).

The steering system 13 is an electric power steering system, a steer-by-wire (SBW) system, or the like. The steering system 13 has an actuator 13a and a torque sensor 13b. The steering system 13 operates the actuator 13a under control of the ECU 24 described later or the like, thereby turning some or all of the wheels 3. The torque sensor 13b detects torque generated in response to the operation of the steering unit 4 by the driver, and transmits the detection result to the ECU 24.

The brake system 18 includes an anti-lock brake system (ABS), electronic stability control (ESC), an electric brake system, brake-by-wire (BBW), and the like. The brake system 18 has an actuator 18a and a brake sensor 18b. The brake system 18 operates the actuator 18a under control of the ECU 24 described later or the like, thereby applying braking force to the wheels 3. The brake sensor 18b detects the position (displacement) of a brake pedal serving as a movable part of the braking operation unit 6, and transmits the detection result to the ECU 24.

The steering angle sensor 19 is a sensor configured to detect an operation amount of the steering unit 4 by the driver. For example, the steering angle sensor 19 includes a Hall element, and detects a rotation angle of a rotating part of the steering unit 4 as a steering amount, and transmits the detection result to the ECU 24. The accelerator sensor 20 detects the position (displacement) of an accelerator pedal serving as a movable part of the acceleration operation unit 5, and transmits the detection result to the ECU 24.

The shift sensor 21 detects the position of a movable part of the shift lever and the like of the gear shift operation unit 7, and transmits the detection result to the ECU 24. The wheel speed sensor 22 detects the rotation amount of the wheels 3 and the number of rotations of the wheels 3 per unit time, and transmits the detection result to the ECU 24.

The ECU 24 has a hardware configuration similar to a general computer, having, for example, a central processing unit (CPU) 24a, a read only memory (ROM) 24b, a random access memory (RAM) 24c, a display control unit 24d, a voice control unit 24e, and a solid-state drive (SSD) 24f.

The CPU 24a is a control unit configured to control the entire vehicle 1. The CPU 24a reads a computer program stored in a storage device such as a ROM 24b or an SSD 24f, and operates in accordance with instructions included in the computer program to execute various kinds of processing. For example, the RAM 24c is used as a work area for the CPU 24a to execute various kinds of processing.

The display control unit 24d controls the output of images through the display 8. The voice control unit 24e controls the output of voice through the voice output device 9.

In the ECU 24 according to the embodiment, the CPU 24a, the ROM 24b, and the RAM 24c may be mounted on a single integrated circuit. In the ECU 24 according to the embodiment, as the control unit configured to control the entire vehicle 1, a processor such as a digital signal processor (DSP) or a logic circuit may be provided instead of the CPU 24a. In the embodiment, as a main storage device configured to store therein computer programs executed by the CPU 24a, a hard disk drive (HDD) may be provided instead of the SSD 24f (or in addition to the SSD 24f). Furthermore, in the embodiment, an external device connected to the ECU 24 may have the SSD 24f serving as a main storage device.

With the configuration described above, the ECU 24 transmits control signals to the units in the vehicle 1 through the in-vehicle network 23 to integrally control the units in the vehicle 1. In this case, the ECU 24 can use the image data obtained from the imaging units 15 and detection results of various kinds of sensors acquired through the in-vehicle network 23 for the control. Various kinds of sensors include the torque sensor 13b, the brake sensor 18b, the steering angle sensor 19, the accelerator sensor 20, the shift sensor 21, and the wheel speed sensor 22 described above. The ECU 24 can also use information on input operations using the touch panel 10, which is acquired through the in-vehicle network 23, for the control.

In the embodiment, the ECU 24 is configured to assist the parking operation of the vehicle 1 by controlling the steering system 13, the brake system 18, and the gear shift operation unit 7. For example, the ECU 24 is configured to acquire a parking region present on the road surface around the vehicle 1 based on the image data obtained from the imaging units 15, set a parking target position in the parking region, and thereby execute parking assist control for moving the vehicle 1 to the parking target position by automated driving.

Conventionally, techniques for executing the above-mentioned parking assist control while displaying a parking region serving as a parking target on a peripheral image that represents the conditions around the vehicle 1 have been known. Examples of such conventional techniques include a technique for starting the parking assist control when a position on the touch panel 10 corresponding to a start button displayed in a region different from (apart from) a region in which the peripheral image and the parking region are displayed is touched in a state in which the peripheral image and the parking region are displayed on the display 8.

In the above-mentioned conventional techniques, however, the peripheral image and the parking region are displayed in a region different from (apart from) the region in which the start button is displayed, and hence the relation therebetween is less intuitively intelligible. In particular, when there are parking regions where the vehicle 1 is parkable, it is hard for the user to recognize for which parking region the parking assist control will be started by the operation of the start button, and therefore the operation may be complicated.

Thus, in the embodiment, a parking assist device 400 as a function module group implemented in the ECU 24 in order to execute parking assist control is configured as follows to provide an interface that makes the operation for starting parking assist control intuitively intelligible and simple.

Figure 4:
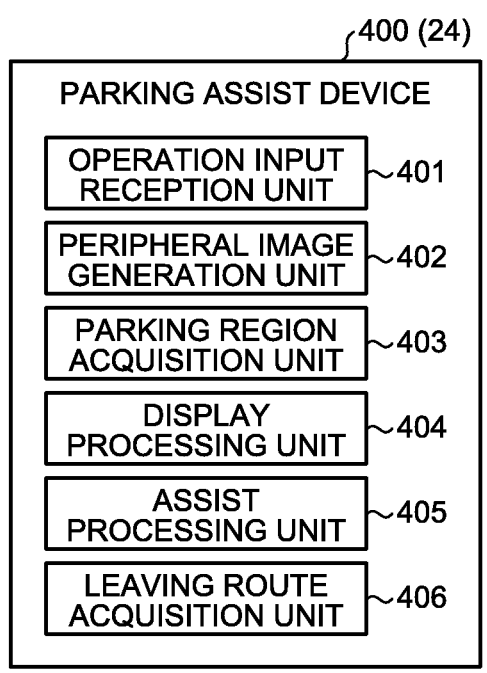
FIG. 4 is an exemplary block diagram illustrating the functional configuration of a parking assist device according to the embodiment.

FIG. 4 is an exemplary block diagram illustrating the functional configuration of the parking assist device 400 according to the embodiment. The parking assist device 400 is a function module group implemented in the ECU 24 as a result of the CPU 24a in the ECU 24 executing predetermined software (control program) stored in the ROM 24b or the SSD 24f. Note that, in the embodiment, a part or whole of the function module group illustrated in FIG. 4 may be implemented by dedicated hardware (circuit).

As illustrated in FIG. 4, the parking assist device 400 includes an operation input reception unit 401, a peripheral image generation unit 402, a parking region acquisition unit 403, a display processing unit 404, an assist processing unit 405, and a leaving route acquisition unit 406.

The operation input reception unit 401 receives an operation input from a user through the touch panel 10. Examples of the operations input through the touch panel 10 include various kinds of operations, such as a touch operation for touching a position (region) on the touch panel 10 and a long-press operation for performing the touch operation continuously for a predetermined period or more.

The peripheral image generation unit 402 generates a peripheral image representing the conditions around the vehicle 1 based on imaging results (image data) of the imaging units 15. For example, the peripheral image generation unit 402 generates the above-mentioned overhead image (ground view) as an example of the peripheral image. The overhead image is generated by subjecting four kinds of image data obtained from the imaging units 15 provided on the front, rear, right, and left sides of the vehicle 1 to various kinds of image processing such as viewpoint transformation and combining.

Note that the peripheral image used in the embodiment is not limited to only the overhead image. Although described in detail later, examples of the peripheral image can include a front image (front view) representing only the conditions ahead of the vehicle 1, side images (side views) representing only the conditions of the right and left sides of the vehicle 1, and a rear image (rear view) representing only the conditions behind the vehicle 1. The peripheral image can include a 3D image three-dimensionally representing the conditions around the vehicle 1.

The parking region acquisition unit 403 acquires (detects, specifies, calculates) a parking region where the vehicle 1 is parkable. For example, when a parking lot is explicitly sectioned by parking frames such as white lines, the parking region acquisition unit 403 detects the parking frames by image recognition based on imaging results of the imaging units 15, thereby specifying candidates of parking regions constituted by the parking frames. Taking information on the states of the vehicle 1 such as the current position and the speed of the vehicle 1 and the current steering angle of the vehicle 1 into account, the parking region acquisition unit 403 extracts a region for which a parking route can be realistically calculated from among the candidates of the parking regions specified by using the image recognition, thereby acquiring the parking region.

The display processing unit 404 displays the above-mentioned peripheral image on the display 8 in the display device 11, and displays a first symbol representing the above-mentioned parking region on the peripheral image. In this manner, in the embodiment, a parking assist screen 500 serving as an interface that makes an operation for starting parking assist control more intuitively intelligible as described below is provided. In the following, an example where a frame displayed to surround a parking region (hereinafter referred to as "parkable frame") is used as the first symbol is described, but in the embodiment, symbols other than the parkable frame may be used.

Figure 5:
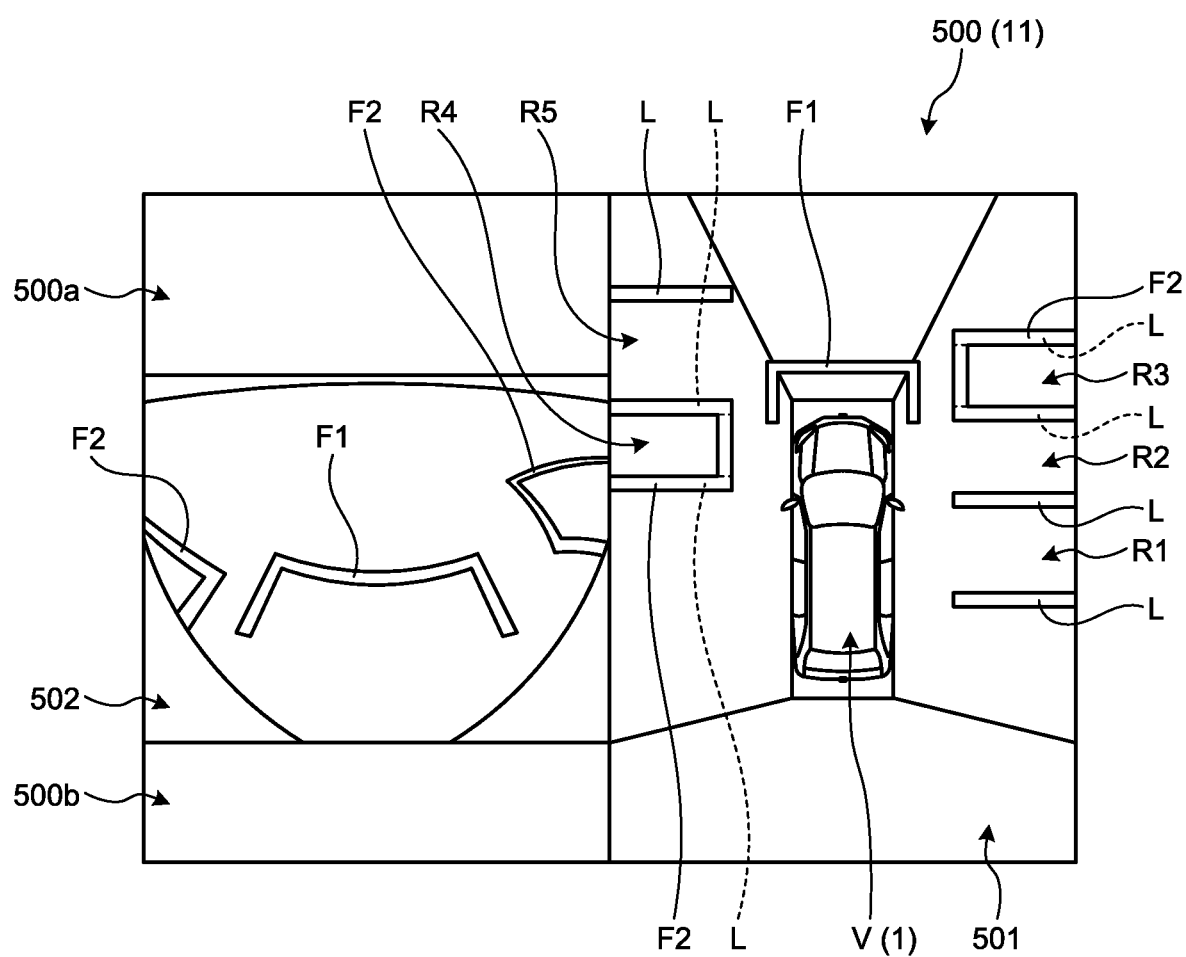
FIG. 5 is an exemplary diagram illustrating an example of a parking assist screen displayed on a display device when the vehicle according to the embodiment is parked.

FIG. 5 is an exemplary diagram illustrating an example of the parking assist screen 500 displayed on the display device 11 when the vehicle 1 is parked according to the embodiment. The parking assist screen 500 is invoked in response to an operation by the user, such as touching the touch panel 10 or pressing another physical button/switch (not illustrated), and is displayed on the display 8 in the display device 11.

As illustrated in FIG. 5, an overhead image 501 as an example of the peripheral image and a front image 502 as another example of the peripheral image are displayed side by side on the parking assist screen 500. The overhead image 501 and the front image 502 represent the same conditions although the viewpoints are different.

In the overhead image 501 illustrated in FIG. 5, symbol V represents the current conditions (such as position and orientation) of the vehicle 1. Thus, the overhead image 501 enables the user to understand that regions R1 to R5 sectioned by white lines L exist around the vehicle 1. In the overhead image 501, symbol F1 represents a symbol displayed as a guide of a course of the vehicle 1 (hereinafter referred to as "guide line F1").

The example illustrated in FIG. 5 assumes the conditions that the parking region acquisition unit 403 acquires, as the above-mentioned parking regions, the region R3 located ahead of the vehicle 1 on the right and the region R4 located slightly ahead of the vehicle 1 on the left, among the regions R1 to R5 present around the vehicle 1. Thus, in the example illustrated in FIG. 5, the display processing unit 404 displays parkable frames F2 serving as the above-mentioned first symbols so as to surround the regions R3 and R4 on the overhead image 501. The parkable frames F2 are displayed to be superimposed on the white lines L. The transparency of the parkable frames F2 may be set such that the superimposed white lines L can be visually recognized or may be set such that the white lines L cannot be visually recognized.

Note that, as described above, in the example illustrated in FIG. 5, the overhead image 501 and the front image 502 represent the same conditions although the viewpoints are different. Thus, in the example illustrated in FIG. 5, a guide line F1 and parkable frames F2 similar to those on the overhead image 501 are also displayed on the front image 502 displayed side by side with the overhead image 501. Note that, in the front image 502 illustrated in FIG. 5, the illustration of the white lines L illustrated on the overhead image 501 is omitted for simplicity.

As described above, the embodiment provides an interface that makes the operation for starting the parking assist control more intuitively intelligible and simpler. Thus, in the embodiment, a parkable frame F2 serving as a first symbol representing a parking region is configured to function as a button (switch) serving as a trigger to start the parking assist control.

Specifically, referring back to FIG. 4, in the embodiment, when the position corresponding to the parkable frame F2 on the touch panel 10 (for example, a part of the parkable frame F2) is touched, the assist processing unit 405 starts parking assist control for assisting the parking at a parking region surrounded by the parkable frame F2. Consequently, even when the regions R3 and R4 are acquired as parking regions as in the example illustrated in FIG. 5, desired parking assist control can be started by an intuitively intelligible and simple operation of touching a parkable frame F2 corresponding to a region where the vehicle 1 is to be parked.

In the embodiment, similarly to the start of the parking assist control, it is desired that the parking assist control can be stopped by an intuitively intelligible and simple operation. Thus, in the embodiment, the assist processing unit 405 stops the parking assist control that is being executed when the position corresponding to the parkable frame F2 (for example, a part of the parkable frame F2) is touched after the start of the parking assist control.

In the example illustrated in FIG. 5, although the parkable frames F2 are displayed on both of the overhead image 501 and the front image 502, the same results are obtained when either one of the parkable frame F2 in the overhead image 501 and the parkable frame F2 in the front image 502 is touched.

In the embodiment, when the position corresponding to the parkable frame F2 is to be touched, it is convenient if the user can easily recognize whether it is before the start of the parking assist control (not executed) or after the start of the parking assist control (being executed). Thus, in the embodiment, the display processing unit 404 makes the display form of the parkable frame F2 before the parking assist control is started different from the display form of the parkable frame F2 after the parking assist control is started. As a method for changing the display form of the parkable frame F2, various methods including a method for switching the color of the boarder constituting the parkable frame F2 and a method for switching the line type of the boarder constituting the parkable frame F2 between a solid line and a broken line can be applied.

In the embodiment, it is convenient if the user can easily recognize whether the position corresponding to the parkable frame F2 has actually been touched. Thus, in the embodiment, the display processing unit 404 makes the display form of the parkable frame F2 when the position corresponding to the parkable frame F2 is touched different from the display form of the parkable frame F2 when the position corresponding to the parkable frame F2 is not touched. Similarly to the above, various methods can be applied as the method for changing the display form of the parkable frame F2.

In general, when the vehicle 1 moves, a parking region where the vehicle 1 is parkable also changes accordingly. Thus, in the embodiment, it is desired that such a change of parking regions can be visually recognized. Thus, in the embodiment, when the vehicle 1 is unparkable in a first region that has been recently acquired as a parking region due to the movement of the vehicle 1, the parking region acquisition unit 403 newly acquires a second region as a parking region that is different from the first region. The first region corresponds to a region that is currently surrounded by the parkable frame F2 in the parking assist screen 500, and the second region corresponds to a region that should be newly surrounded by the parkable frame F2 in the parking assist screen 500. The display processing unit 404 displays the parkable frame F2 in a display form with which the switching of the parking region from the first region to the second region is recognizable. Examples of the specific method therefor include a method for gradually changing the color or line type of the boarder constituting the parkable frame F2 as the parkable frame F2 is switched from the first region to the second region.

Furthermore, in the embodiment, it is convenient if the display position of the parkable frame F2 can be (finely) adjusted. Thus, in the embodiment, when a nearby position near the position corresponding to the parkable frame F2 has been touched continuously for a predetermined period or more, the display processing unit 404 moves the display position of the parkable frame F2 toward the nearby position. Consequently, the display position of the parkable frame F2 can be easily adjusted by an intuitively intelligible operation method involving the long-press operation onto a movement target position. The movement of the display position of the parkable frame F2 may be stopped at a timing at which the long-press operation is released, or stopped at a timing at which the parkable frame F2 has reached the position subjected to the long-press operation.

In FIG. 5 referred to above, two types of peripheral images (overhead image 501 and front image 502) have been exemplified. As described above, however, in the embodiment, other types of peripheral images are assumed. Specific examples of other types of peripheral images are briefly described below.

Figure 6:
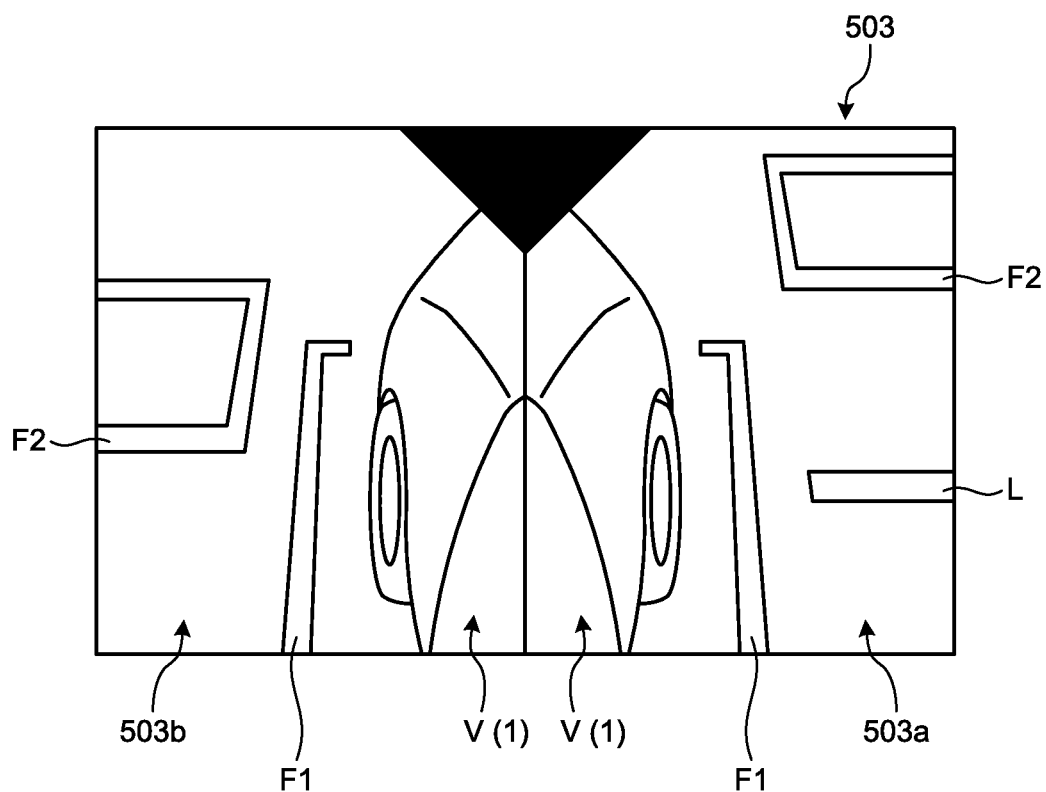
FIG. 6 is an exemplary diagram illustrating another example of a peripheral image that can be displayed on the parking assist screen according to the embodiment.

FIG. 6 and FIGS. 7A to 7D are exemplary diagrams illustrating other examples of peripheral images that can be displayed on the parking assist screen 500 according to the embodiment. More specifically, FIG. 6 is an exemplary diagram illustrating a side image 503 representing the conditions on the right and left sides of the vehicle 1. FIGS. 7A to 7D are exemplary diagrams illustrating 3D images 504 three-dimensionally representing the conditions around the vehicle 1.

The conditions represented by the side image 503 and the 3D images 504 are the same as the conditions represented by the overhead image 501 and the front image 502 illustrated in FIG. 5 except that the viewpoint and the display form (representation form) are different. Thus, the same various kinds of symbols as those on the overhead image 501 (front image 502) are displayed on the side image 503 and the 3D images 504 as well. In the 3D images 504 illustrated in FIGS. 7A to 7D, the illustration of guide lines F1 is omitted for simplicity.

The side image 503 illustrated in FIG. 6 is configured such that a right side image 503*a* representing the conditions on the right side of the vehicle 1 and a left side image 503*b* representing the conditions on the left side of the vehicle 1 are laterally displayed side by side. Similarly to the above-mentioned overhead image 501 (front image 502), the user can start parking assist control to a corresponding parking region by touching the parkable frame F2 displayed on the side image 503.

Figure 7A:
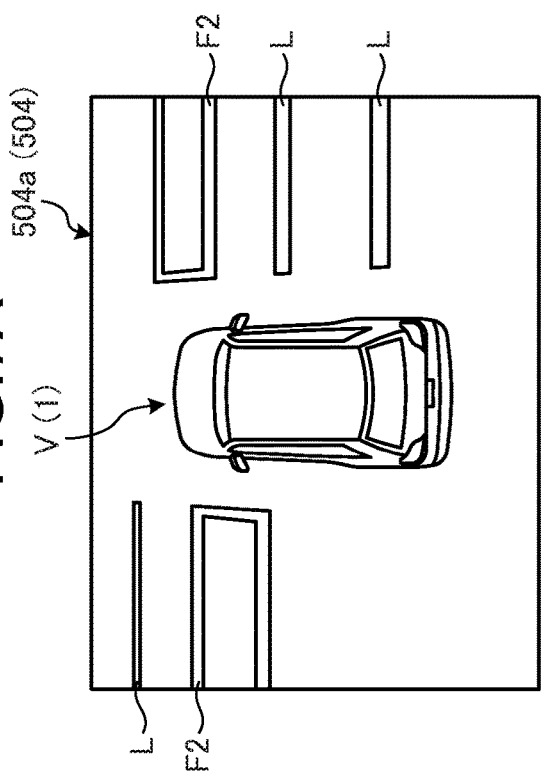
FIGS. 7A to 7D are exemplary diagrams illustrating another example different from FIG. 6 of the peripheral images that can be displayed on the parking assist screen according to the embodiment.
Figure 7B:
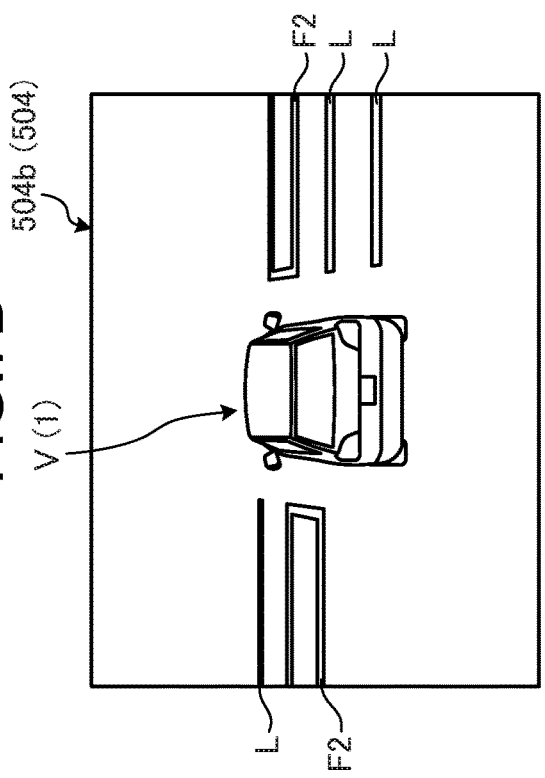
Figure 7C:
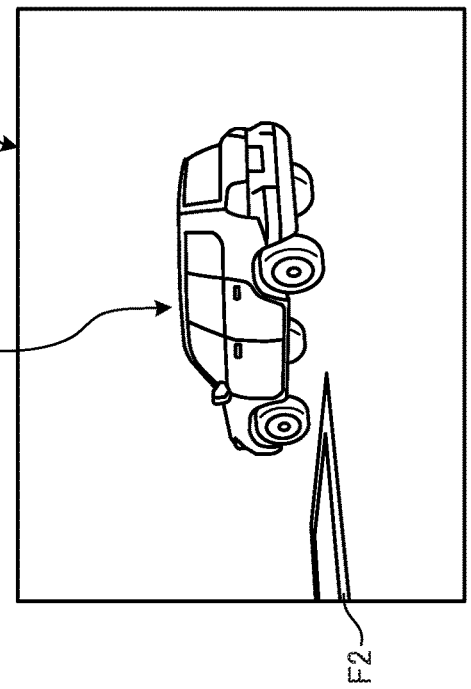
Figure 7D:
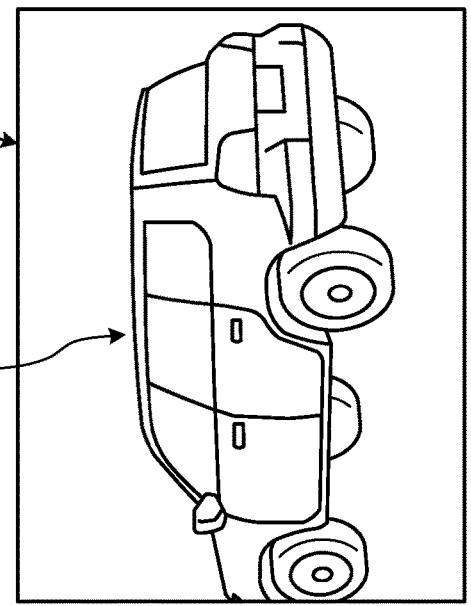

The 3D images 504 illustrated in FIGS. 7A to 7D are configured such that the viewpoint and scale can be variously changed in response to the operation by the user. In the example illustrated in FIGS. 7A to 7D, a 3D image 504*a* in FIG. 7A, a 3D image 504*b* in FIG. 7B, a 3D image 504*c* in FIG. 7C, and a 3D image 504*d* in FIG. 7D represent the same conditions except that the viewpoint and the scale are different. By operating the touch panel 10, the user can switch these 3D images 504*a* to 504*d* (and other 3D images with different viewpoint and scale). It should be understood that also in the 3D images 504, parking assist control can be started by touching the parkable frame F2.

In this manner, in the embodiment, the peripheral image generation unit 402 can generate a plurality of types of peripheral images. In FIG. 5 referred to above, an example where two types of peripheral images are displayed simultaneously (side by side) on the parking assist screen 500 has been exemplified. On the parking assist screen 500 according to the embodiment, three or more types of peripheral images may be displayed simultaneously, or only one type of peripheral image may be displayed. The configuration in which peripheral images are simultaneously displayed enables information in various aspects to be transmitted to the user at the same time (efficiently). On the other hand, the configuration in which only one type of peripheral image is displayed enables information in a given aspect to be effectively transmitted to the user by maximally utilizing the wide screen of the display device 11 (display 8).

In the embodiment, it is convenient if the user can be notified that the operation of touching the parkable frame F2 is a trigger to start (or stop) the parking assist control. Thus, referring back to FIG. 5, in the embodiment, the display processing unit 404 may display a message that prompts the user to touch the parkable frame F2 in a free region 500a or 500b in the parking assist screen 500. This configuration enables the user to be visually notified of the procedure of starting the parking assist control. The method for notifying the user of the procedure of starting the parking assist control is not limited to a visual method using a screen. An auditory method using voice may be applied, or a method using both a screen and voice may be applied.

In the embodiment, as the method for visually notifying the user of the procedure of starting the parking assist control, a method for further displaying a second symbol that prompts the user to touch the parkable frame F2 on the peripheral image as described below can be used. An example where a balloon-shaped pop-up including a simple message to prompt the user to touch the parkable frame F2 is used as an example of the second symbol is described below.

Figure 8:
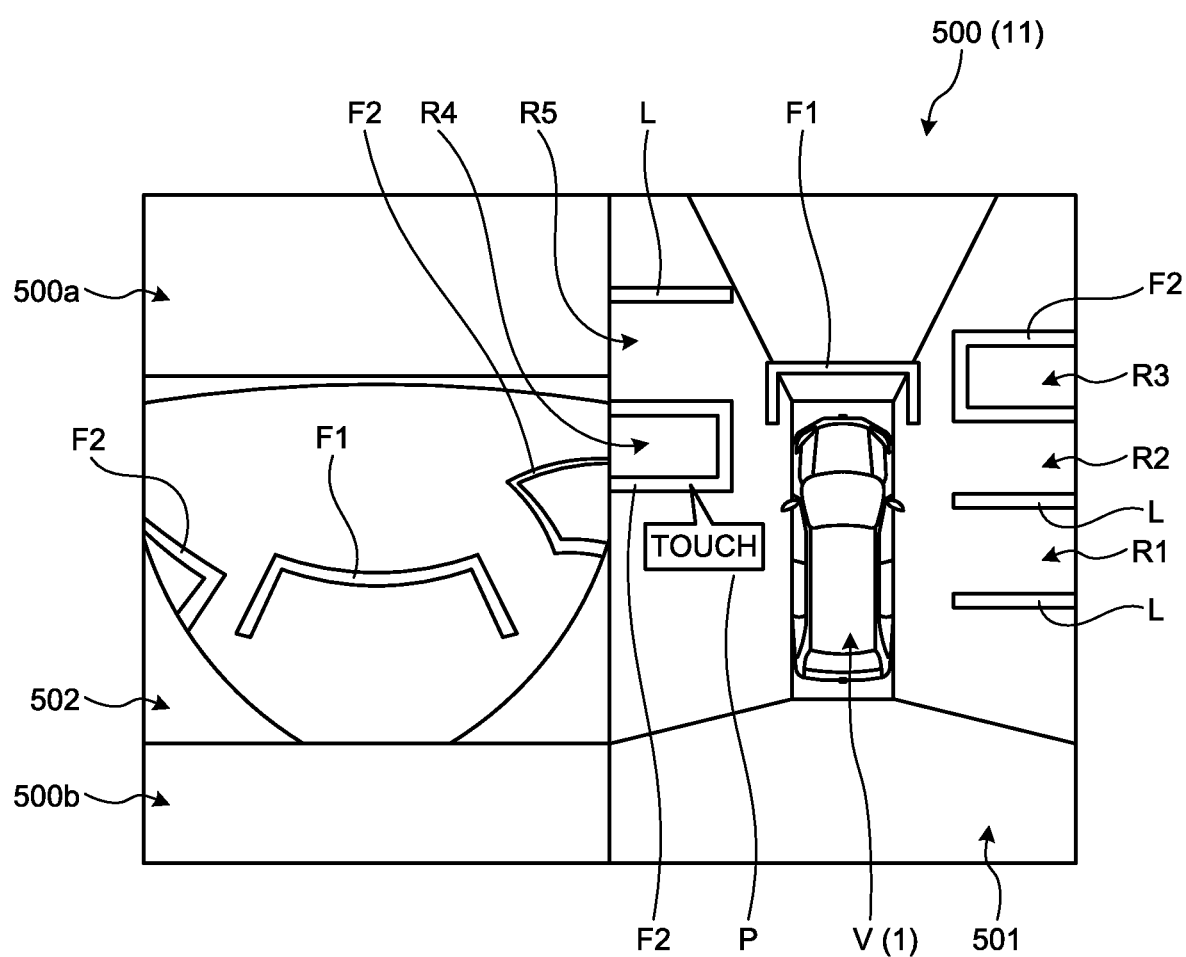
FIG. 8 is an exemplary diagram illustrating a state in which a pop-up that prompts a user to touch a parkable frame is displayed on the parking assist screen according to the embodiment.

FIG. 8 is an exemplary diagram illustrating the state in which a pop-up P that prompts the user to touch a parkable frame F2 is displayed on the parking assist screen 500 according to the embodiment. As illustrated in FIG. 8, the pop-up P is located near the parkable frame F2 to intelligibly notify the user that the parkable frame F2 is a target to be touched.

The pop-up P is displayed to be superimposed on the overhead image 501, which may hinder the confirmation of the conditions around the vehicle 1 in some cases. Thus, in the embodiment, the display processing unit 404 may display the pop-up P only when the speed of the vehicle 1 is equal to or lower than a threshold. In this manner, the display timing of the pop-up P can be limited to only a situation where the conditions around the vehicle 1 are not abruptly changed.

In the embodiment, a symbol other than the above-mentioned pop-up P may be used as the second symbol. Other examples of the second symbol include the following example.

Figure 9:
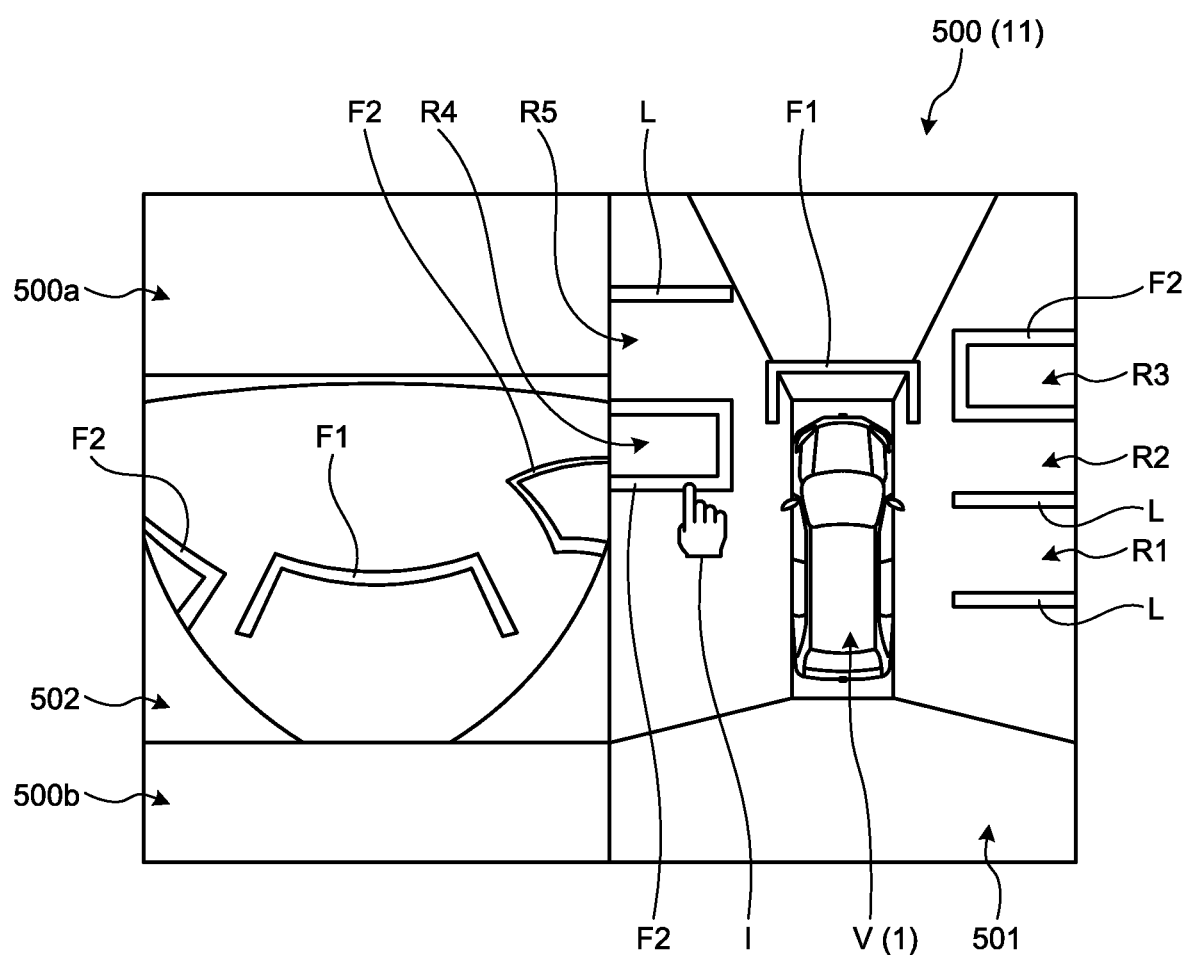
FIG. 9 is an exemplary diagram illustrating a state in which an icon that prompts the user to touch the parkable frame is displayed on the parking assist screen according to the embodiment.

FIG. 9 is an exemplary diagram illustrating a state in which an icon I that prompts the user to touch the parkable frame F2 is displayed on the parking assist screen 500 according to the embodiment. As illustrated in FIG. 9, the icon I as another example of the second symbol is formed to have a shape corresponding to human fingers, and a part corresponding to an index finger is displayed to indicate the parkable frame F2, thereby intelligibly notifying the user that the parkable frame F2 is to be touched. Similarly to the above-mentioned pop-up P, the display timing of the icon I is limited to the situation where the conditions around the vehicle 1 are not abruptly changed.

In the embodiment, a combination of the pop-up P illustrated in FIG. 8 and the icon I illustrated in FIG. 9 may be used as the second symbol. Specifically, the display processing unit 404 according to the embodiment may prompt the user to touch a parkable frame F2 by using the display of the pop-up P and the display of the icon I in combination. Furthermore, in the embodiment, it should be understood that symbols in forms other than the pop-up P and the icon I may be used as the second symbol.

As described above, the embodiment has various features for notifying the user that the trigger to start the parking assist control is to touch the parkable frame F2. It may be more convenient if there is another trigger to start the parking assist control in addition to touching the parkable frame F2. Thus, in the embodiment, the display processing unit 404 may further display, on the parking assist screen 500, an assist start button B serving as a trigger to start the parking assist control as described below. The assist start button B may be displayed all the time, or may be displayed only under a given situation.

Figure 10:
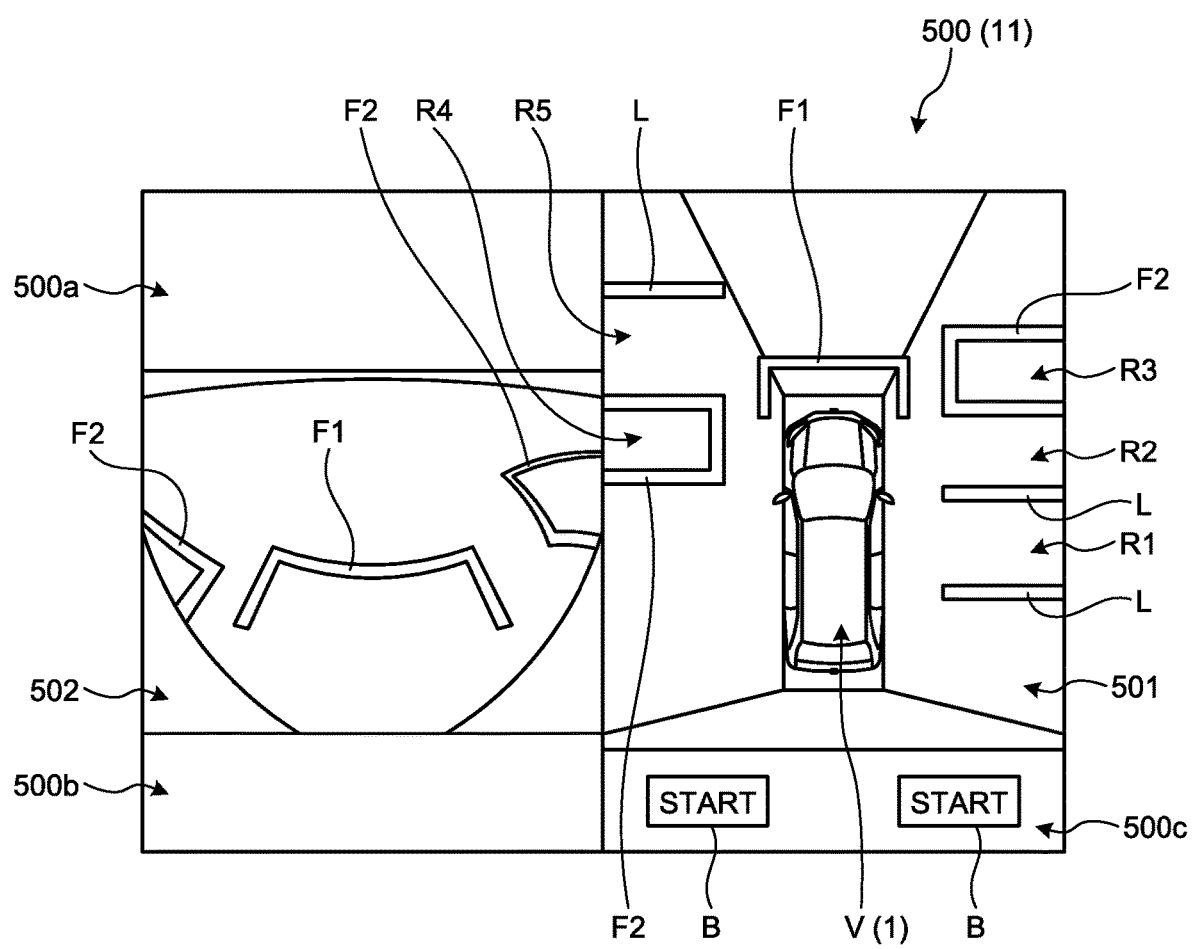
FIG. 10 is an exemplary diagram illustrating a state in which assist start buttons are displayed on the parking assist screen according to the embodiment.

FIG. 10 is an exemplary diagram illustrating a state in which assist start buttons B are displayed on the parking assist screen 500 according to the embodiment. In the example illustrated in FIG. 10, the assist start buttons B are displayed in a region 500c provided at the lower part of the overhead image 501. The two assist start buttons B are provided so as to correspond to two parkable frames F2 surrounding two parking regions R3 and R4 present on the right and left sides of the vehicle 1.

In the example illustrated in FIG. 10, when the right assist start button B is touched, the same result as obtained when the right parkable frame F2 is touched is obtained, and when the left assist start button B is touched, the same result as obtained when the left parkable frame F2 is touched is obtained. Specifically, in the example illustrated in FIG. 10, when the right assist start button B is touched, parking assist control at the parking region R3 is started, and when the left assist start button B is touched, parking assist control at the parking region R4 is started.

In this manner, in the embodiment, the same number of assist start buttons B as the number of parkable frames F2 are provided at positions corresponding to the parkable frames F2, and hence the user can intelligibly recognize that the touch on the assist start button B is equivalent to the touch on the parkable frame F2.

Furthermore, in the embodiment, under a situation where a plurality of types of peripheral images (overhead image 501 and front image 502) are displayed side by side as illustrated in FIG. 10, the assist start buttons B are fixedly displayed in a region near one of the peripheral images that is displayed at the position closest to the driver's seat in the vehicle 1. For example, in the example illustrated in FIG. 10, the assist start buttons B are fixedly displayed, on the parking assist screen 500, in a region 500c at the lower part of the overhead image 501 displayed on the right side (see FIG. 1) to which the driver's seat is closed. Consequently, the assist start buttons B can be easily touched from the driver's seat.

The techniques in the above-mentioned embodiment is applicable to not only the case of executing parking assist control for the vehicle 1 but also the case of executing leaving assist control for the vehicle 1. For example, the leaving assist control is executed in order for the vehicle 1 to leave parallel parking by automated driving.

Specifically, referring back to FIG. 4, a leaving route acquisition unit 406 acquires a leaving route for the parked vehicle 1. For leaving assist, the display processing unit 404 displays a screen including a peripheral image (leaving assist screen 600 described later) on the display device 11, and displays a third symbol representing a leaving direction along the leaving route on the peripheral image. When a position corresponding to the third symbol on the touch panel 10 is touched, the assist processing unit 405 starts leaving assist control for assisting the leaving along the leaving direction represented by the third symbol. An example where arrows representing leaving directions are used as the third symbols is described below, but in the embodiment, a symbol other than the arrows may be used.

Figure 11:
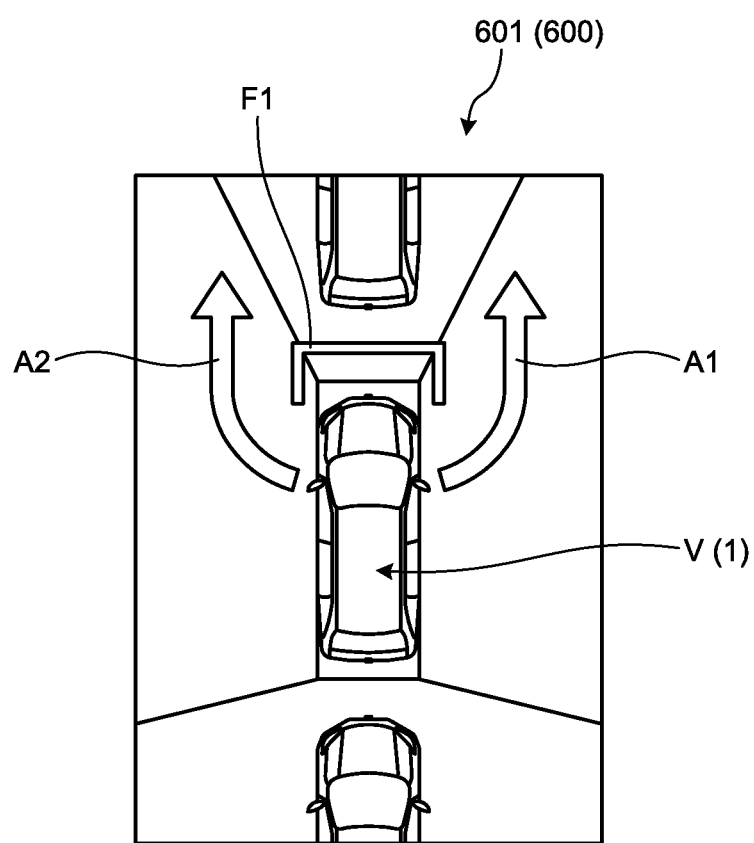
FIG. 11 is an exemplary diagram illustrating an example of a leaving assist screen displayed on the display device when the vehicle according to the embodiment leaves parallel parking.

FIG. 11 is an exemplary diagram illustrating an example of the leaving assist screen 600 displayed on the display device 11 when the vehicle 1 according to the embodiment leaves parallel parking. In the example illustrated in FIG. 11, the leaving assist screen 600 includes only an overhead image 601. A guide line F1 illustrated in FIG. 11 is the same as the guide line F1 illustrated in FIG. 5 and other figures.

In the example illustrated in FIG. 11, there are two directions in which the vehicle 1 can leave: a direction represented by an arrow A1; and a direction represented by an arrow A2. By touching the arrow A1, the user can start leaving assist control to the arrow A1 side (right side), and by touching the arrow A2, the user can start leaving assist control to the arrow A2 side (left side).

In this manner, according to the embodiment, an interface that makes the operation for starting the leaving assist control intuitively intelligible and simple can be provided. In the example illustrated in FIG. 11, the leaving assist screen 600 includes only one type of peripheral image (overhead image 601), but in the embodiment, the leaving assist screen 600 may include two or more types of peripheral images. It should be understood that the above-mentioned techniques such as the pop-up P (see FIG. 8), the icon I (see FIG. 9), and the assist start button B (see FIG. 10) can be applied not only to the parking assist screen 500 but also to the leaving assist screen 600.

Next, processing executed in the embodiment is described.

Figure 12:
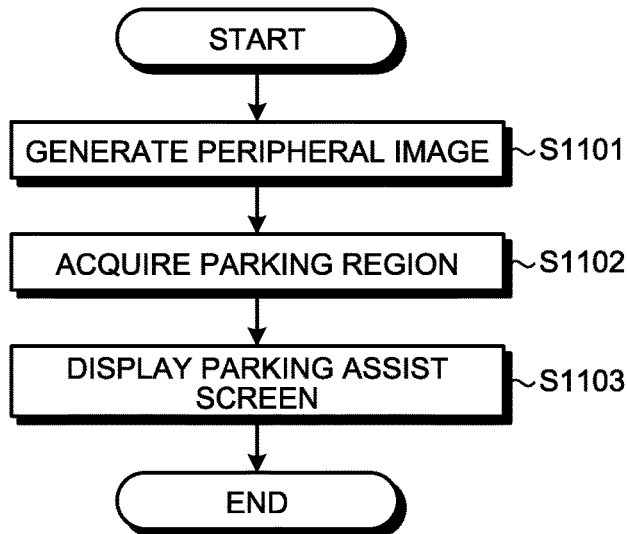
FIG. 12 is a schematic and exemplary flowchart illustrating processing executed when the parking assist device according to the embodiment displays the parking assist screen.

FIG. 12 is a schematic and exemplary flowchart illustrating the processing executed when the parking assist device 400 displays the parking assist screen 500 according to the embodiment. The processing flow illustrated in FIG. 12 is executed in response to the user's operation for invoking the parking assist screen 500.

In the processing flow illustrated in FIG. 12, first, at step S1101, the peripheral image generation unit 402 acquires imaging results (image data) of the imaging units 15, and generates a peripheral image representing the conditions around the vehicle 1 based on the obtained image data. Only one type of peripheral image may be generated, or a plurality of types of peripheral images may be generated.

At step S1102, the parking region acquisition unit 403 acquires parking regions where the vehicle 1 is parkable based on the image data obtained from the imaging units 15. For example, when a parking lot is explicitly sectioned by parking frames such as white lines, the parking region acquisition unit 403 acquires a parking region for which a parking route can be realistically calculated from the current position by the above-mentioned procedure including the detection of a parking frame by image recognition.

At step S1103, the display processing unit 404 displays the parking assist screen 500 by combining the peripheral image generated at step S1101 and the parkable frame F2 surrounding the parking region acquired at step S1102. Then, the processing is finished.

After the processing flow illustrated in FIG. 12 is executed, the parking assist device 400 executes various kinds of processing as described below in response to an operation input received by the operation input reception unit 401.

Figure 13:
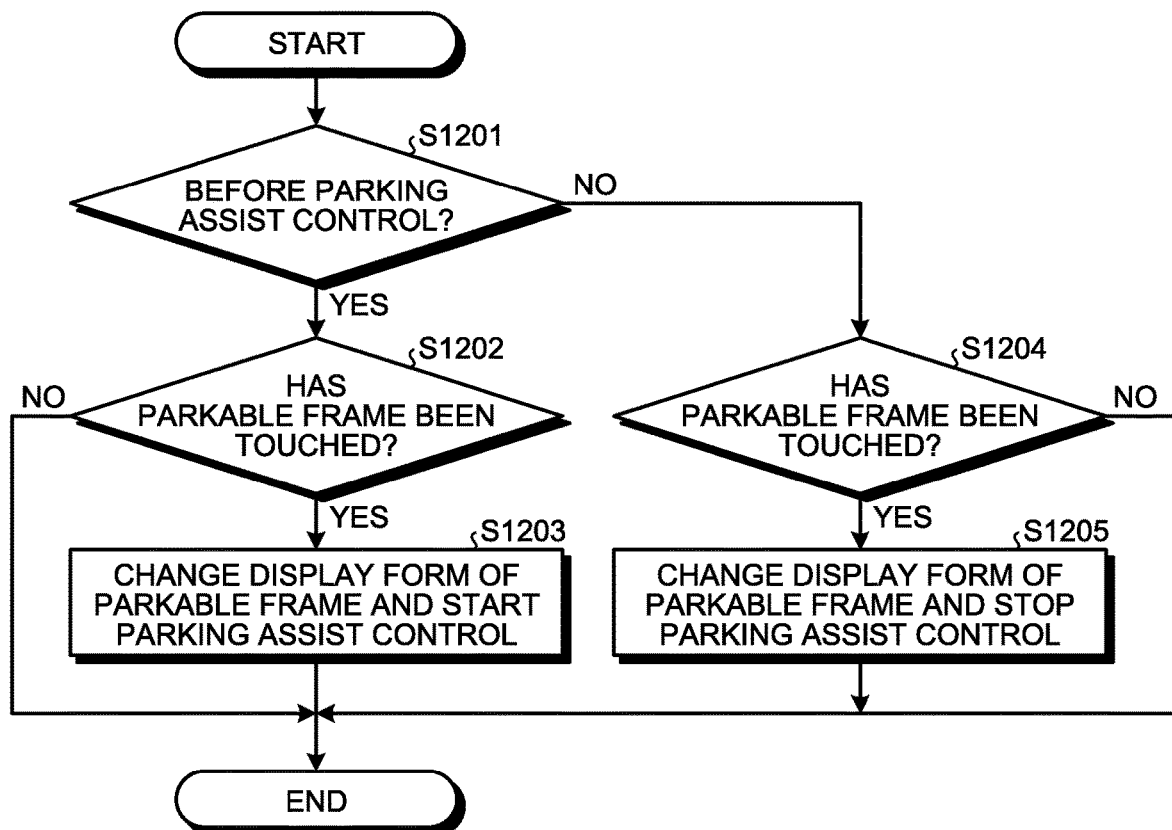
FIG. 13 is a schematic and exemplary flowchart illustrating processing executed when the parking assist device according to the embodiment starts or stops parking assist control.

FIG. 13 is a schematic and exemplary flowchart illustrating the processing executed when the parking assist device 400 starts or stops parking assist control according to the embodiment.

In the processing flow illustrated in FIG. 13, first, at step S1201, the assist processing unit 405 determines whether the current time point is before the start of parking assist control. When it is determined at step S1201 that the current time point is before the start of parking assist control, the processing proceeds to step S1202.

At step S1202, the assist processing unit 405 determines whether the parkable frame F2 has been touched. Specifically, the assist processing unit 405 determines whether an operation for touching the parkable frame F2 has been detected by the operation input reception unit 401.

When it is determined at step S1202 that the parkable frame F2 has not been touched, the processing is finished. On the other hand, when it is determined at step S1202 that the parkable frame F2 has been touched, the processing proceeds to step S1203.

At step S1203, the display processing unit 404 changes the display form of the parkable frame F2, and the assist processing unit 405 starts parking assist control. More specifically, when the parkable frame F2 is touched, the display processing unit 404 displays the parkable frame F2 in the display form different from that when the parkable frame F2 is not touched, and the assist processing unit 405 starts parking assist control in response to the touch of the parkable frame F2. After the start of parking assist control, the display processing unit 404 displays the parkable frame F2 in the display form different from that before the start of parking assist control. Then, the processing is finished.

On the other hand, when it is determined at step S1201 that the current time point is after the parking assist control, the processing proceeds to step S1204. At step S1204, the assist processing unit 405 determines whether the parkable frame F2 has been touched.

When it is determined at step S1204 that the parkable frame F2 is not touched, the processing is finished. On the other hand, when it is determined at step S1204 that the parkable frame F2 has been touched, the processing proceeds to S1205.

At step S1205, the display processing unit 404 changes the display form of the parkable frame F2, and the assist processing unit 405 stops the parking assist control. More specifically, when the parkable frame F2 is touched, the display processing unit 404 displays the parkable frame F2 in the display form different from that when the parkable frame F2 is not touched, and the assist processing unit 405 stops the parking assist control in response to the touch of the parkable frame F2. After the stop of parking assist control, the display processing unit 404 displays the parkable frame F2 in the display form different from that before the stop of parking assist control. Then, the processing is finished.

Figure 14:
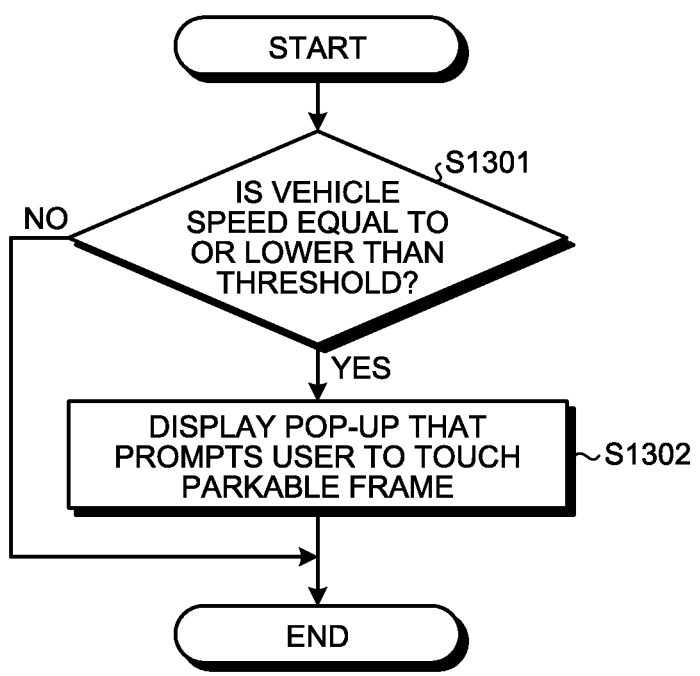
FIG. 14 is a schematic and exemplary flowchart illustrating processing executed when the parking assist device according to the embodiment displays a pop-up that prompts the user to touch the parkable frame.

FIG. 14 is a schematic and exemplary flowchart illustrating processing executed when the parking assist device 400 according to the embodiment displays a pop-up P that prompts the user to touch the parkable frame F2.

In the processing flow illustrated in FIG. 14, first, at step S1301, the display processing unit 404 determines whether the vehicle speed, which is the current speed of the vehicle 1, is equal to or lower than a threshold. When it is determined at step S1301 that the vehicle speed is higher than the threshold, the processing is finished. On the other hand, when it is determined at step S1301 that the vehicle speed is equal to or lower than the threshold, the processing proceeds to step S1302.

At step S1302, the display processing unit 404 displays, at a nearby position near the parkable frame F2, the pop-up P that prompts the user to touch the parkable frame F2. Then, the processing is finished.

Figure 15:
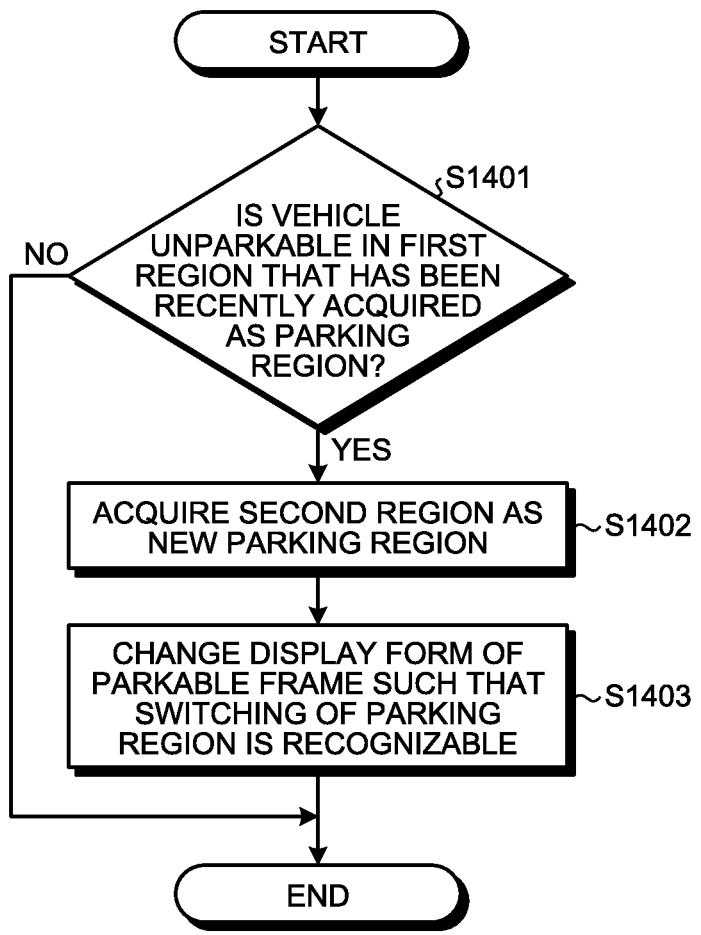
FIG. 15 is a schematic and exemplary flowchart illustrating processing executed when the parking assist device according to the embodiment controls a display form of the parkable frame in accordance with the movement of the vehicle.

FIG. 15 is a schematic and exemplary flowchart illustrating processing executed when the parking assist device 400 according to the embodiment controls the display form of the parkable frame F2 in accordance with the movement of the vehicle 1.

In the processing flow illustrated in FIG. 15, first, at step S1401, the parking region acquisition unit 403 determines whether the vehicle 1 is unparkable in a first region that has been recently acquired as a parking region, that is, a region currently surrounded by the parkable frame F2 in the parking assist screen 500.

When it is determined at step S1401 that the vehicle 1 is still parkable in the first region, the processing is finished. On the other hand, when it is determined at step S1401 that the vehicle 1 is no longer parkable in the first region, the processing proceeds to step S1402.

At step S1402, the parking region acquisition unit 403 acquires a second region as a new parking region, that is, a region that should be newly surrounded by the parkable frame F2 in the parking assist screen 500.

At step S1403, the display processing unit 404 changes the display form of the parkable frame F2 such that the switching of the parking region from the first region to the second region is recognizable. Examples of the specific method therefor have been described above, and hence the description thereof is omitted. Then, the processing is finished.

Figure 16:
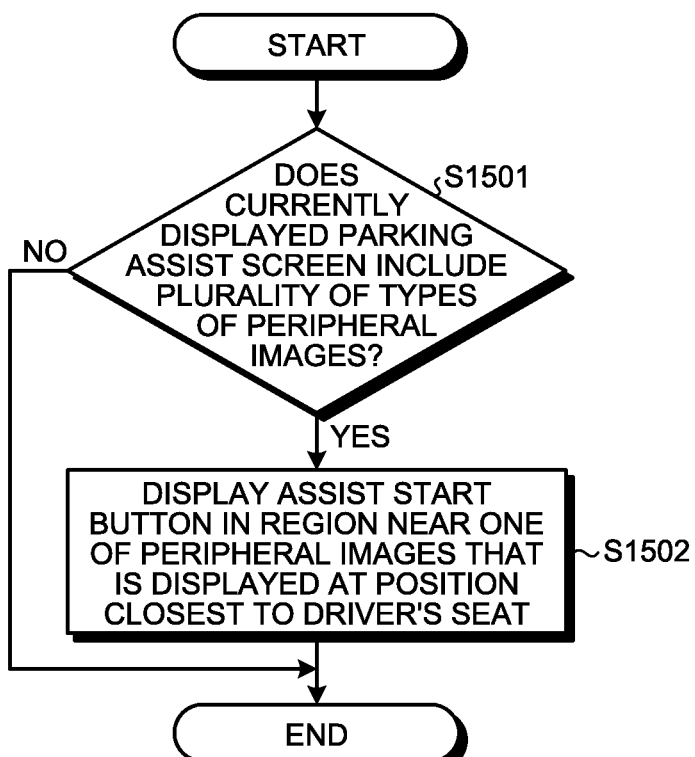
FIG. 16 is a schematic and exemplary flowchart illustrating processing executed when the parking assist device according to the embodiment displays assist start buttons on the parking assist screen.

FIG. 16 is a schematic and exemplary flowchart illustrating processing executed when the parking assist device 400 according to the embodiment displays an assist start button B on the parking assist screen 500.

In the processing flow illustrated in FIG. 16, first, at step S1501, the display processing unit 404 determines whether the currently displayed parking assist screen 500 includes a plurality of types of peripheral images.

When it is determined at step S1501 that the parking assist screen 500 includes only one type of peripheral image, the processing is finished. On the other hand, when it is determined at step S1501 that the parking assist screen 500 is configured such that a plurality of types of peripheral images are displayed side by side, the processing proceeds to step S1502.

At step S1502, the display processing unit 404 displays an assist start button B in a region near one of the plurality of types of peripheral images that is displayed at a position closest to a driver's seat. In this case, when there are parkable frames F2, the same number of the assist start buttons B as the number of the parkable frames F2 are provided at positions corresponding to the parkable frames F2, and the above-mentioned significant effect can be obtained. Then, the processing is finished.

Figure 17:
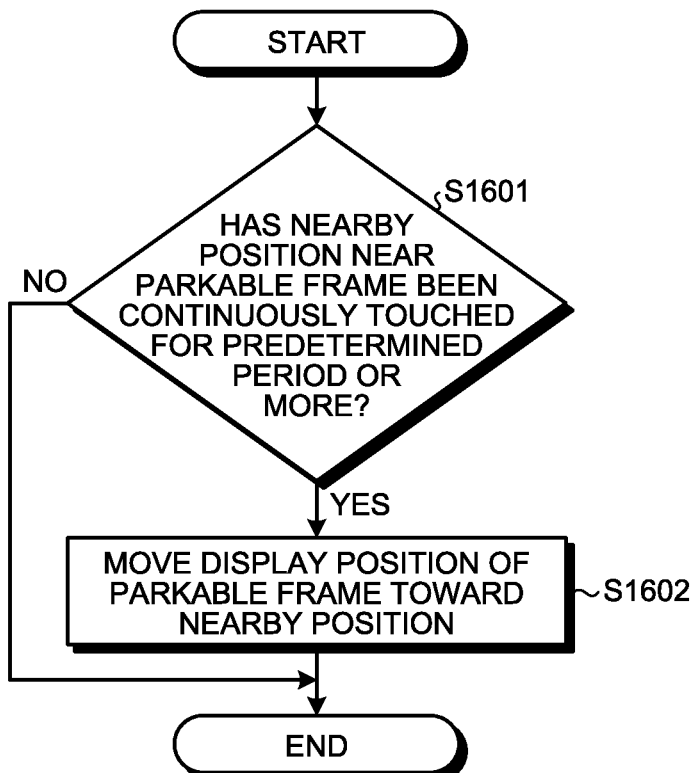
FIG. 17 is a schematic and exemplary flowchart illustrating processing executed when the parking assist device according to the embodiment moves a display position of the parkable frame.

FIG. 17 is a schematic and exemplary flowchart illustrating processing executed when the parking assist device 400 according to the embodiment moves the display position of the parkable frame F2.

In the processing flow illustrated in FIG. 17, first, at step S1601, the display processing unit 404 determines whether a nearby position near the parkable frame F2 has been touched continuously for a predetermined period or more. Specifically, the display processing unit 404 determines whether a long-press operation on a nearby position near the parkable frame F2 has been detected by the operation input reception unit 401.

When it is determined at step S1601 that the long-press operation has not been detected, the processing is finished. On the other hand, when the long-press operation has been detected at step S1601, the processing proceeds to step S1602.

At step S1602, the display processing unit 404 gradually moves the display position of the parkable frame F2 toward a nearby position near the parkable frame F2 subjected to the long-press operation. As described above, the timing at which the movement of the display position of the parkable frame F2 is stopped may be a timing at which the long-press operation is released, or may be a timing at which the parkable frame F2 has reached the position subjected to the long-press operation. Then, the processing is finished.

Figure 18:
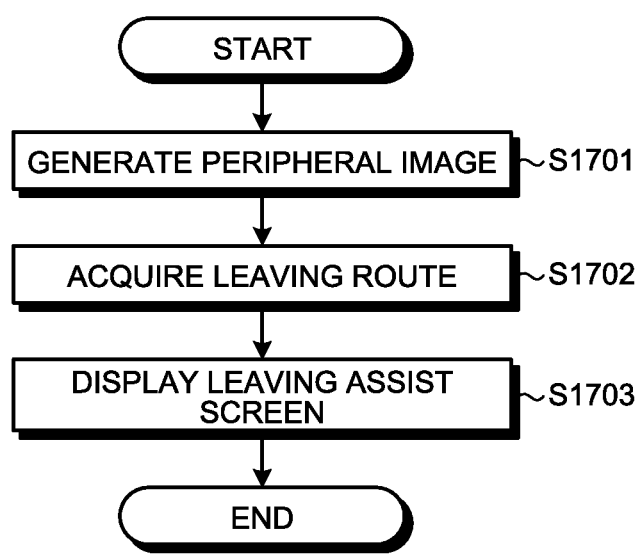
FIG. 18 is a schematic and exemplary flowchart illustrating processing executed when the parking assist device according to the embodiment displays the leaving assist screen.

FIG. 18 is a schematic and exemplary flowchart illustrating processing executed when the parking assist device 400 according to the embodiment displays the leaving assist screen 600.

The processing flow illustrated in FIG. 18 is basically the same as the processing flow illustrated in FIG. 12 except for the following two points: a leaving route rather than a parking region is acquired; and the leaving assist screen 600 rather than the parking assist screen 500 is displayed.

Specifically, in the processing flow illustrated in FIG. 18, first, at step S1701, the peripheral image generation unit 402 generates a peripheral image representing the conditions around the vehicle 1. At step S1702, the leaving route acquisition unit 406 acquires a leaving route in which the vehicle 1 can leave. At step S1703, the display processing unit 404 displays the leaving assist screen 600 by combining the peripheral image generated at S1701 and arrows A1 and A2 along the leaving route acquired at step S1702. Then, the processing is finished.

It should be understood that after the processing flow illustrated in FIG. 18 is executed, the parking assist device 400 can execute various kinds of processing same as those executed by the above-mentioned parking assist control in response to operation inputs received by the operation input reception unit 401.

As described above, in the embodiment, the display processing unit 404 displays a peripheral image on the display device 11, and displays parkable frame F2 representing a parking region on the peripheral image, and when a position corresponding to the parkable frame F2 on the touch panel 10 is touched, the assist processing unit 405 starts parking assist control for assisting the parking at the parking region represented by the parkable frame F2. Consequently, the parking assist control at the parking region represented by the parkable frame F2 can be started simply by touching the position corresponding to the parkable frame F2, and hence an interface that makes the operation for starting the parking assist control intuitively intelligible and simple can be provided.

In the embodiment, when the position corresponding to the parkable frame F2 is touched after the start of the parking assist control, the assist processing unit 405 stops the parking assist control. Consequently, after the start of the parking assist control, the currently executed parking assist control can be stopped in an intuitively intelligible and simple manner simply by touching the parkable frame F2 corresponding to a parking region serving as a parking target in the parking assist control.

In the embodiment, the display processing unit 404 makes the display form of the parkable frame F2 before the parking assist control is started different from the display form of the parkable frame F2 after the parking assist control is started. Consequently, simply by viewing the display form of the parkable frame F2, it can be easily determined whether the parking assist control is not started yet or has been started, that is, whether the parking assist control is currently executed.

In the embodiment, the display processing unit 404 makes the display form of the parkable frame F2 when the position corresponding to the parkable frame F2 is touched different from the display form of the parkable frame F2 when the position corresponding to the parkable frame F2 is not touched. Consequently, the user can be visually intelligibly notified whether the position corresponding to the parkable frame F2 was reliably touched.

In the embodiment, the display processing unit 404 may further display, near the parkable frame F2, the pop-up P that prompts the user to touch the position corresponding to the parkable frame F2. Consequently, the pop-up P enables the user to be visually intelligibly notified that the trigger to start the parking assist control is to touch the position corresponding to the parkable frame F2.

In the embodiment, the display processing unit 404 may display the pop-up P only when the speed of the vehicle 1 is equal to or lower than a threshold. Consequently, the display of the pop-up P, which may hinder the confirmation of the conditions around the vehicle 1, can be limited to only a situation where the speed of the vehicle 1 is equal to or lower than a threshold, which is the situation where the conditions around the vehicle 1 are not abruptly changed.

In the embodiment, when the vehicle 1 is unparkable in a first region that has been recently acquired as a parking region due to the movement of the vehicle 1, the parking region acquisition unit 403 may newly acquire a second region as a parking region that is different from the first region, and the display processing unit 404 may display the parkable frame F2 in such a display form that switching of the parking region from the first region to the second region is recognizable. Consequently, the user can be visually intelligibly notified of the switching of the parking region.

In the embodiment, the peripheral image generation unit 402 generates different types of peripheral images, and the display processing unit 404 displays the peripheral images side by side, and displays a parkable frame F2 on each of the peripheral images. Consequently, in the case where a plurality of (types of) peripheral images are displayed side by side, the same parking assist control can be started when the position corresponding to the parkable frame F2 on either one of the peripheral images is touched.

In the embodiment, the display processing unit 404 may fixedly display the assist start button B serving as a trigger to cause the assist processing unit 405 to start the parking assist control in a region near one of the peripheral images that is displayed at a position closest to the driver's seat in the vehicle 1. Consequently, the assist start button B that is more directly intelligible as the trigger to start the parking assist control can be fixedly provided at the position at which the assist start button B can be easily operated from the driver's seat.

In the embodiment, when a nearby position near the position corresponding to the parkable frame F2 has been touched continuously for a predetermined period or more, the display processing unit 404 moves the display position of the parkable frame F2 toward the nearby position. Consequently, the display position of the parkable frame F2 can be easily adjusted by an intuitively intelligible operation method involving the long-press operation onto a movement target position.

In the embodiment, the peripheral image includes the overhead image 501 in which the conditions around the vehicle 1 are seen from above in a bird's eye view. Consequently, the overhead image 501 enables the user to be intelligibly notified of the conditions (and parking regions) around the vehicle 1.

In the embodiment, the peripheral image includes the 3D images 504 three-dimensionally representing the conditions around the vehicle 1. Consequently, the 3D images 504 enable the user to be intelligibly notified of the conditions (and parking regions) around the vehicle 1.

In the embodiment, the parkable frame F2 is displayed so as to surround a parking region. Consequently, the parking region can be displayed with emphasis in a visually intelligible manner.

In the embodiment, the parking assist device 400 further includes the leaving route acquisition unit 406 configured to acquire leaving route for the parked vehicle 1, the display processing unit 404 displays the arrows A1/A2 representing leaving directions along leaving routes on the peripheral image, and when the position corresponding to the arrow A1/A2 on the touch panel 10 is touched, the assist processing unit 405 starts leaving assist control for assisting the leaving along the leaving direction represented by the arrow A1/A2. Consequently, the leaving assist control for moving the vehicle along the leaving direction represented by the arrow A1/A2 can be started simply by touching the position corresponding to the arrow A1/A2, and hence an interface that makes the operation for starting the leaving assist control intuitively intelligible and simple can be provided.

In the above-mentioned embodiment, the parking assist device 400 capable of executing two kinds of driving assist controls, the parking assist control and the leaving assist control, has been exemplified. However, the techniques in the embodiment is applicable also to a driving assist device capable of executing only one of the parking assist control and the leaving assist control.

The techniques in the embodiment is applicable also to a driving assist device capable of executing driving assist control other than the parking assist control and the leaving assist control as long as an interface that makes an operation for starting driving assist control intuitively intelligible and simple is provided. In other words, the techniques in the embodiment is applicable to any driving assist device, as long as "the driving assist device includes: a peripheral image generation unit configured to generate a peripheral image representing conditions around a vehicle based on an imaging result of imaging units provided to the vehicle; an acquisition unit configured to acquire a target position or a target direction on a route in which the vehicle is movable; a display processing unit configured to display the peripheral image on a display device including a touch panel, and display a symbol representing the target position or the target direction on the peripheral image; and an assist processing unit configured to start, when a position corresponding to the symbol on the touch panel is touched, assist for moving the vehicle to the target position represented by the symbol or moving the vehicle along the target direction represented by the symbol".

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking assist device, comprising:
at least one processor configured to implement:
a peripheral image generation unit configured to generate a peripheral image representing conditions around a vehicle based on an imaging result of an imaging unit provided to the vehicle;
a parking region acquisition unit configured to acquire a parking region where the vehicle is parkable;
a display processing unit configured to display the peripheral image on a display device including a touch panel, and display a first symbol representing the parking region on the peripheral image; and
an assist processing unit configured to start, when a position corresponding to the first symbol on the touch panel is touched, parking assist control for assisting parking at the parking region represented by the first symbol,
wherein the first symbol includes a frame displayed so as to surround the parking region, and
wherein the display processing unit is configured to further display, near the first symbol, a second symbol that prompts a user to touch a position corresponding to the first symbol.

2. The parking assist device according to claim 1, wherein the assist processing unit is configured to stop the parking assist control when the position corresponding to the first symbol is touched after the parking assist control is started.

3. The parking assist device according to claim 2, wherein the display processing unit is configured to make a display form of the first symbol before the parking assist control is started different from a display form of the first symbol after the parking assist control is started.

4. The parking assist device according to claim 1, wherein the display processing unit is configured to make a display form of the first symbol when the position corresponding to the first symbol is touched different from a display form of the first symbol when the position corresponding to the first symbol is not touched.

5. The parking assist device according to claim 1, wherein the display processing unit is configured to display the second symbol only when speed of the vehicle is equal to or lower than a threshold.

6. The parking assist device according to claim 1, wherein when the vehicle is unparkable in a first region that has been recently acquired as the parking region due to movement of the vehicle, the parking region acquisition unit is configured to newly acquire a second region as the parking region that is different from the first region, and
the display processing unit is configured to display the first symbol in such a display form that switching of the parking region from the first region to the second region is recognizable.

7. The parking assist device according to claim 1, wherein the peripheral image generation unit is configured to generate different types of peripheral images, and the display processing unit is configured to display the peripheral images side by side, and display the first symbol on each of the peripheral images.

8. The parking assist device according to claim 7, wherein the display processing unit is configured to fixedly display a button serving as a trigger to cause the assist processing unit to start the parking assist control in a region near one of the peripheral images that is displayed at a position closest to a driver's seat in the vehicle.

9. The parking assist device according to claim 1, wherein when a nearby position near a position corresponding to the first symbol has been continuously touched for a predetermined period or more, the display processing unit is configured to move a display position of the first symbol toward the nearby position.

10. The parking assist device according to claim 1, wherein
the peripheral image includes an overhead image in which the conditions around the vehicle are seen from above in a bird's eye view.

11. The parking assist device according to claim 1, wherein
the peripheral image includes a 3D image that three-dimensionally represents the conditions around the vehicle.

12. The parking assist device according to claim 1, further comprising a leaving route acquisition unit configured to acquire a leaving route for the parked vehicle, wherein
the display processing unit is configured to display a third symbol representing a leaving direction along the leaving route on the peripheral image, and
the assist processing unit is configured to start, when a position corresponding to the third symbol on the touch panel is touched, leaving assist control for assisting leaving along the leaving direction represented by the third symbol.

13. A parking assist device, comprising:
a peripheral image generation unit configured to generate a peripheral image representing conditions around a vehicle based on an imaging result of an imaging unit provided to the vehicle;
a parking region acquisition unit configured to acquire a parking region where the vehicle is parkable;
a display processing unit configured to display the peripheral image on a display device including a touch panel, and display a first symbol representing the parking region on the peripheral image; and
an assist processing unit configured to start, when a position corresponding to the first symbol on the touch panel is touched, parking assist control for assisting parking at the parking region represented by the first symbol, wherein
when the vehicle is unparkable in a first region that has been recently acquired as the parking region due to movement of the vehicle, the parking region acquisition unit is configured to newly acquire a second region as the parking region that is different from the first region, and
the display processing unit is configured to display the first symbol in such a display form that switching of the parking region from the first region to the second region is recognizable.

14. The parking assist device according to claim 13, wherein the assist processing unit is configured to stop the parking assist control when the position corresponding to the first symbol is touched after the parking assist control is started.

15. The parking assist device according to claim 13, further comprising a leaving route acquisition unit configured to acquire a leaving route for the parked vehicle, wherein the display processing unit is configured to display a third symbol representing a leaving direction along the leaving route on the peripheral image, and the assist processing unit is configured to start, when a position corresponding to the third symbol on the touch panel is touched, leaving assist control for assisting leaving along the leaving direction represented by the third symbol.

16. A parking assist device, comprising:

a peripheral image generation unit configured to generate a peripheral image representing conditions around a vehicle based on an imaging result of an imaging unit provided to the vehicle;

a parking region acquisition unit configured to acquire a parking region where the vehicle is parkable;

a display processing unit configured to display the peripheral image on a display device including a touch panel, and display a first symbol representing the parking region on the peripheral image;

an assist processing unit configured to start, when a position corresponding to the first symbol on the touch panel is touched, parking assist control for assisting parking at the parking region represented by the first symbol; and a leaving route acquisition unit configured to acquire a leaving route for the parked vehicle, wherein the display processing unit is configured to display a third symbol representing a leaving direction along the leaving route on the peripheral image, and the assist processing unit is configured to start, when a position corresponding to the third symbol on the touch panel is touched, leaving assist control for assisting leaving along the leaving direction represented by the third symbol.

17. The parking assist device according to claim 16, wherein the assist processing unit is configured to stop the parking assist control when the position corresponding to the first symbol is touched after the parking assist control is started.

\* \* \* \* \*